(12) United States Patent
Yu et al.

(10) Patent No.: US 11,627,290 B2
(45) Date of Patent: Apr. 11, 2023

(54) SIGNAL COMMUNICATION OVER AN OPTICAL LINK

(71) Applicant: WINGCOMM Co. Ltd., Nantong (CN)

(72) Inventors: Jianming Yu, Nantong (CN); Zuodong Wang, Beijing (CN); Wei Mao, Palo Alto, CA (US); Yun Bai, Beijing (CN)

(73) Assignee: WINGCOMM CO. LTD.

( * ) Notice: Subject to any disclaimer, the term of this patent is extended or adjusted under 35 U.S.C. 154(b) by 0 days.

(21) Appl. No.: 17/876,193

(22) Filed: Jul. 28, 2022

(65) Prior Publication Data

US 2022/0368864 A1 Nov. 17, 2022

Related U.S. Application Data

(63) Continuation of application No. 17/353,109, filed on Jun. 21, 2021, now Pat. No. 11,438,556.

(30) Foreign Application Priority Data

Nov. 16, 2020 (CN) .......................... 202011276575.8

(51) Int. Cl.
*H04N 7/22* (2006.01)
*H04L 5/16* (2006.01)
*H04N 7/01* (2006.01)

(52) U.S. Cl.
CPC ................. *H04N 7/22* (2013.01); *H04L 5/16* (2013.01); *H04N 7/0125* (2013.01)

(58) Field of Classification Search
CPC .......... H04N 7/22; H04N 7/0125; H04N 7/01; H04N 5/765; H04L 5/16; G09G 2370/047; G09G 2370/06; G09G 2370/10; G09G 2370/12; G09G 2370/18; G09G 5/006

See application file for complete search history.

(56) References Cited

U.S. PATENT DOCUMENTS

| | | | |
|---|---|---|---|
| 2011/0063501 A1* | 3/2011 | Bar-Niv ................. | G09G 5/006 348/E7.001 |
| 2015/0186303 A1* | 7/2015 | Qiu ....................... | G06F 13/102 710/16 |
| 2019/0116321 A1* | 4/2019 | Grimm ............ | H04N 21/41407 |
| 2021/0392300 A1* | 12/2021 | Tong .................... | G02B 6/4292 |

* cited by examiner

*Primary Examiner* — Michael E Teitelbaum
(74) *Attorney, Agent, or Firm* — David R. Stevens; Stevens Law Group

(57) ABSTRACT

Systems and methods for signal communication over an optical link are described. One aspect includes receiving a source CONFIG1 signal from a DP master device and a sink CONFIG1 signal from a sink terminal. The source and sink CONFIG1 signals are analyzed. It is determined whether a signal transmission mode is a DP protocol. For a DP protocol, a pair of source AUX signals is received from the DP master device. A pair of sink AUX signals is received from the sink terminal. Communication resource contention between the source and sink AUX signals is identified. A communication direction of the communication resources is transitioned to give the source AUX signals precedence over the sink AUX signals. The source AUX signals are transferred to the sink terminal via the communication resources. The direction of the communication resources is again transitioned. The sink AUX signals are transferred to the DP master device.

20 Claims, 14 Drawing Sheets

SIGNAL COMMUNICATION OVER AN OPTICAL LINK

CROSS-REFERENCE TO RELATED APPLICATION

This application is a continuation of U.S. application Ser. No. 17/353,109, filed Jun. 21, 2021, which claims the benefit of Chinese Application Serial No. 202011276575.8, filed Nov. 16, 2020, both of which are hereby incorporated herein by reference in their entirety.

BACKGROUND

Technical Field

The present disclosure relates to systems and methods that dynamically enable switching between DisplayPort (DP) and High-Definition Multimedia Interface (HDMI) protocols and a communication of these protocols using optical communication resources.

Background Art

With the continuous development of display technology and the continuous improvement of display resolution, consumers' demands for display are gradually changing from 4k display resolution to 8k display resolution. DisplayPort (DP) is an open-source audio and video data protocol maintained by VESA, which is increasingly favored by host manufacturers, high-end graphics card manufacturers, and display manufacturers. From DP versions DP1.2 and DP1.4 to the latest DP version DP2.0, data transmission rates of a DP (DisplayPort) interface has increased from 21.6 Gbps-32.5 Gbps to around 77.37 Gbps. As data transmission rates have increased, copper wire transmission has gradually become the bottleneck of display data transmission.

Fiber Optic connections can support much higher data transmission rates than copper. As such, Fiber-to-the-Desk is a more recent trend in display technology development. Low speed signals, including AUX+, AUX− signals (corresponding to a pair of pins in the DisplayPort protocol) and other low-speed signals are an integral component of DP protocols. Therefore, the low cost, low delay and high compatibility optical fiber transmission of these low-speed signals is paramount in the realization of optical fiber DP.

Unfortunately, the half-duplex communication of AUX+ and AUX− is typically incompatible with the unidirectional communication of optical fiber communication. In addition, there can be incompatibilities between DP protocols and HDMI (High Definition Multimedia Interface) and DVI (Digital Visual Interface) protocols, so correctly selecting the actual transmission protocol can be difficult. The fiber transmission problem of low-speed HDMI signals, i.e., SDA (Serial Data Line), SCL (Serial Clock Line) and CEC (Consumer Electronics Control) signals also needs to be solved.

Some of the approaches for low-speed signal transmission of the audio and video data transmission line protocol include:

(1) Reading DisplayPort Configuration Data (DPCD) information at the display device upon power up. This DPCD data is transmitted to the DP source by optical fiber communication. The method can effectively copy DPCD of the display device at the source, so that the DPCD information of the display device can be correctly read when the remote end initiates AUX communication. However, a disadvantage of this scheme is that it cannot support real-time communication functions such as inter-integrated circuit (I2C) over AUX and HDCP (High-bandwidth Digital Content Protection).

(2) Utilizing a store-and-forward mode. AUX (Auxiliary Communication Channel of DP) information is received, and AUX DEFER is used to respond to reception of the AUX information when the device side needs to respond. A master device starts re-access after waiting for a certain delay. A self-defined protocol is used for communication between master and slave devices, and data at both ends is exchanged in the form of packet exchange. When the slave device finishes reading the data, it updates the cache of the master device, and the master device can read the data after retry. However, using this scheme the response delay can be relatively long, and it is necessary to read the response from the slave device before feeding it back to the source device. If there is additional communication after AUX DEFER, the previous communication fails, degrading performance.

SUMMARY

Aspects of the invention are directed to systems and methods for transmitting one or more DP or HDMI low-speed communication signals (e.g., DP or HDMI sideband signals such as DP AUX+/AUX− signals or HDMI SDA/SCL/CEC signals) over an optical communication link. One aspect includes a source interface receiving a source CONFIG. 1 signal from a DP master device, and receiving a sink CONFIG. 1 signal from a sink terminal via communication resources. The source interface may analyze the source CONFIG. 1 signal and the sink CONFIG. 1 signal. Responsive to the analysis, it is determined whether a signal transmission mode associated with the DP master device and the sink terminal is a DP protocol or an HDMI protocol. When the signal transmission mode is a DP protocol, the source interface can receive a source AUX+ signal and a source AUX− signal from the DP master device and can receive a sink AUX+ signal and a sink AUX− signal from the sink terminal via the communication resources. When the signal transmission mode is an HDMI protocol, the source interface can receive a source SDA, a source SCL, and a source CEC signal from the DP master device and can receive a sink SDA, a sink SCL, and a sink CEC signal from the sink terminal via the communication resources.

In an aspect, the source interface identifies half-duplex communication resource contention between the source AUX+ signal and the sink AUX+ signal, and between the source AUX− signal and the sink AUX− signal. In response, the source interface may transition a communication direction of the half-duplex communication resources to give the source AUX+ and the source AUX− signals precedence over the sink AUX+ and the sink AUX− signals.

Subsequent to transitioning the communication direction, the source interface may transfer the source AUX+ and the source AUX− signals to the sink terminal via the communication resources. Subsequent to transferring the source AUX+ and the source AUX− signals, the source interface may again transition the direction of the half-duplex communication resources and transfer the sink AUX+ and the sink AUX− signals to the DP master device.

Another aspect includes a sink interface receiving a sink CONFIG. 1 signal from a DP slave device, and receiving a source CONFIG. 1 signal from a source terminal via communication resources. The sink interface may analyze the sink CONFIG. 1 signal and the source CONFIG. 1 signal, and responsive to the analysis, determine whether a signal transmission mode associated with the DP sink device and the source terminal is a DP protocol or an HDMI protocol. Responsive to determining that the signal transmission mode is a DP protocol, the sink interface may receive a sink AUX+ signal and a sink AUX− signal from the DP slave device. The sink interface may receive a source AUX+ signal and a source AUX− signal from the source terminal via the communication resources.

In an aspect, the sink interface identifies half-duplex communication resource contention between the source AUX+ signal and the sink AUX+ signal, and between the source AUX−− signal and the sink AUX− signal. The source interface may transition a communication direction of the half-duplex communication resources to give the source AUX+ and the source AUX− signals precedence over the sink AUX+ and the sink AUX− signals.

Subsequent to transitioning the communication direction, the sink interface may transfer the source AUX+ and the source AUX− signals to the DP slave device. Subsequent to transferring the source AUX+ and the source AUX− signals, the sink interface may again transition the direction of the half-duplex communication resources and transfer the sink AUX+ and the sink AUX− signals to the source terminal via the communication resources.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
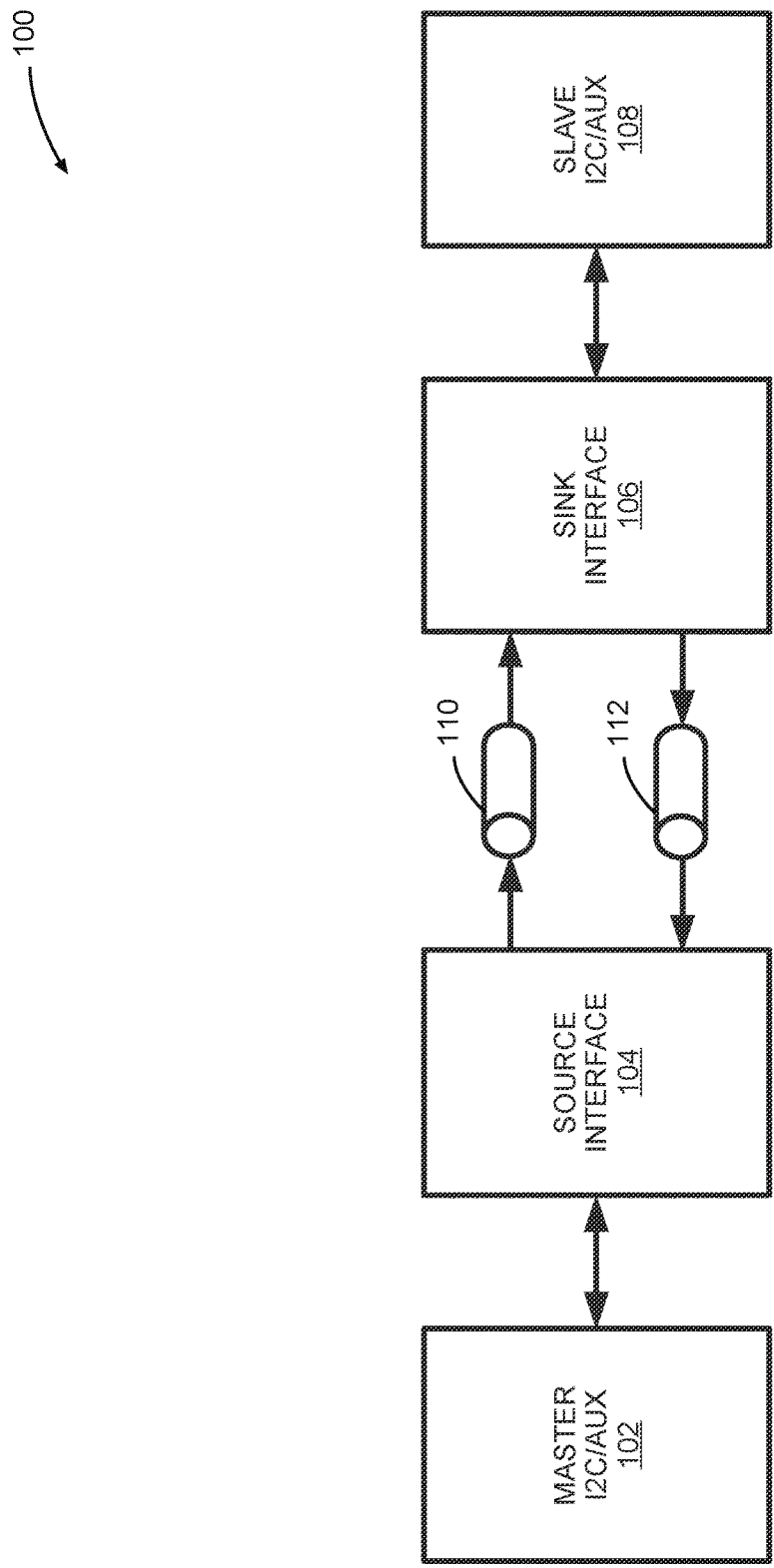
FIG. 1 is a block diagram depicting an example circuit architecture of an optical communication system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein are configured to provide an optical communication system for wire-speed forwarding of DP/DP++ or HDMI protocol low-speed signals (also referred to as "sideband signals"). In one aspect, the optical communication system may include a source interface and a sink interface communicatively coupled (i.e., connected) via a full-duplex optical communication channel (e.g., including two simplex optical fibers, one optical fiber transferring data in each direction). In an aspect, the source interface and sink interface may each include an electro-optical, half-duplex functionality. Collectively, the source interface, the sink interface, and the optical communication channel, or portions thereof, may be referred to as "communication resources." As described herein, the term "DP" may be used to refer to a DisplayPort (DP/DP++) protocol. The term "HDMI" may be used to refer to an High-Definition Multimedia Interface/Digital Visual Interface (HDMI/DVI) protocol. As described herein, DP/DP++, and/or HDMI/DVI signals may be referred to as "digital display signals."

Existing pure optical DP schemes have not dealt with the compatibility of HDMI and DVI protocols, and such DP cables will not work normally for some DP++ (DisplayPort MultiMode, which is a multi-mode protocol compatible with DVI, HDMI and DP) devices or when connecting some adapters from DP to HDMI or DVI.

FIG. 1 is a block diagram depicting an example circuit architecture of an optical communication system 100. As depicted, optical communication system 100 includes a master I2C/AUX 102, a source interface 104, a sink interface 106, and a slave I2C/AUX 108. In an aspect, source interface 104 is communicatively coupled with sink interface 106 via a full-duplex optical communication channel comprising an optical fiber 110 and an optical fiber 112. Optical fiber 110 is a unidirectional (simplex) optical communication channel configured to communicate data from source interface 104 to sink interface 106. Optical fiber 112 is a unidirectional (simplex) optical communication channel configured to communicate data from sink interface 106 to source interface 104. Collectively, optical fiber 110 and optical fiber 112 comprise a full-duplex optical communication channel.

In an aspect, each of source interface 104 and sink interface 106 internally includes half-duplex electro-optical communication functionality. Collectively, source interface 104, sink interface 106, optical fiber 110 and optical fiber 112, or portions thereof, comprise communication resources. In an aspect, the communication resources may be configured to communicate signals in a half-duplex manner.

In an aspect, master I2C/AUX 102 may be configured to transmit or receive one or more signals associated with a DP protocol or an HDMI protocol, to and from source interface 104, respectively, using the communication resources. In one aspect, these signals may be low-speed DP signals or low-speed HDMI signals. Master I2C/AUX 102 may transmit one or more one or more low-speed DP signals or low-speed HDMI signals to source interface 104. In an aspect, these low-speed DP signals or low-speed HDMI signals may be electrical signals, and communication between master I2C/AUX 102 and source interface 104 may be accomplished in a half-duplex manner in accordance with the I2C interface standard. In an aspect, the communication between master I2C/AUX 102 and source interface 104 is accomplished via DP signals being communicated using an AUX communication protocol, or I2C signals being communicated in an inter-integrated circuit (I2C) communication protocol. A selection between the AUX and I2C communication protocols is based on a setting associated with a CONFIG. 1 pin, as described subsequently.

Source interface 104 may convert these low-speed DP signals or low-speed HDMI signals into optical low-speed DP signals or optical low-speed HDMI signals respectively, and transmit the optical low-speed DP signals or optical low-speed HDMI signals over optical fiber 110 to sink interface 106. Sink interface 106 may convert the received optical low-speed DP signals or optical low-speed HDMI signals into electrical low-speed DP signals or electrical low-speed HDMI signals respectively, and transmit these electrical low-speed DP signals or electrical low-speed HDMI signals to slave I2C/AUX 108. In an aspect, the communication between sink interface 106 and slave I2C/AUX 108 is accomplished via DP signals being communicated using an AUX communication protocol, or I2C signals being communicated in an inter-integrated circuit (I2C) communication protocol. A selection between the AUX and I2C communication protocols is based on a setting associated with a CONFIG. 1 pin, as described subsequently.

In an aspect, slave I2C/AUX 108 is configured to transmit or receive one or more sideband signals associated with a DP protocol or an HDMI protocol, to and from sink interface 106, respectively. In one aspect, these signals may be low-speed DP signals or low-speed HDMI signals. Slave I2C/AUX 108 may transmit one or more low-speed DP signals or low-speed HDMI signals to sink interface 106. In an aspect, these low-speed DP signals or low-speed HDMI signals may be electrical signals. Sink interface 106 may convert these low-speed DP signals or low-speed HDMI signals into optical low-speed DP signals or optical low-speed HDMI signals. Sink interface 106 can transmit these optical low-speed DP signals or optical low-speed HDMI signals over optical fiber 112 to source interface 104. Source interface 104 can receive the low-speed DP signals or low-speed HDMI signals over optical fiber 112 from sink interface 106. Source interface 104 can convert the received optical low-speed DP signals or optical low-speed HDMI signals into electrical low-speed DP signals or electrical low-speed HDMI signals. Source interface 104 can transmit these electrical low-speed DP signals or electrical low-speed HDMI signals to master I2C/AUX 102. In this way, optical communication system 100 can transmit one or more I2C signals associated with low-speed DP signaling or low-speed HDMI signaling over an optical channel, from slave I2C/AUX 108 to master I2C/AUX 102, or vice versa.

In an aspect, master I2C/AUX 102 and source interface 104 communicate using an inter-integrated circuit (I2C) communication protocol, and sink interface 106 and slave I2C/AUX 108 communicate using an inter-integrated circuit (I2C) communication protocol. In one aspect, I2C communication supported by optical communication system 100 satisfies requirements of low-speed signals associated with digital display signal protocols (at an I2C communication rate (e.g., up to 400 KHz). In addition, different timing implementations of I2C communication may be used to perform different communication functions associated with low-speed DP, low-speed HDMI, or DVI signaling. For example, a clock extension of slave I2C/AUX 108 can be correctly reflected to master I2C/AUX 102 using the I2C communication protocol.

In an aspect, optical communication system 100 is implemented as a connecting cable that connects a DP source or an HDMI source (e.g., a computer or a DVD player) with a corresponding DP sink or an HDMI sink (e.g., a computer display or television). In such an implementation, master I2C/AUX 102, and source interface 104 may be integrated into a first DP connector, and sink interface 106, and slave I2C/AUX 108 may be integrated into a second DP connector. The first DP connector and the second DP connector may be optically coupled using an optical communication channel comprised of one or more optical fibers. One or more additional adapters can be used to provide a mechanical interface between the first DP connector or the second DP connector and a corresponding HDMI source or HDMI sink.

In an aspect, optical communication system 100 is configured to communicate either low-speed DP communication signals or low-speed HDMI communication signals. optical system 100 may be configured to switch between communication of either low-speed DP communication signals or low-speed HDMI communication signals in accordance with one or more configuration (CONFIG) signals received independently from master I2C/AUX 102 and slave I2C/AUX 108, respectively.

Figure 2:
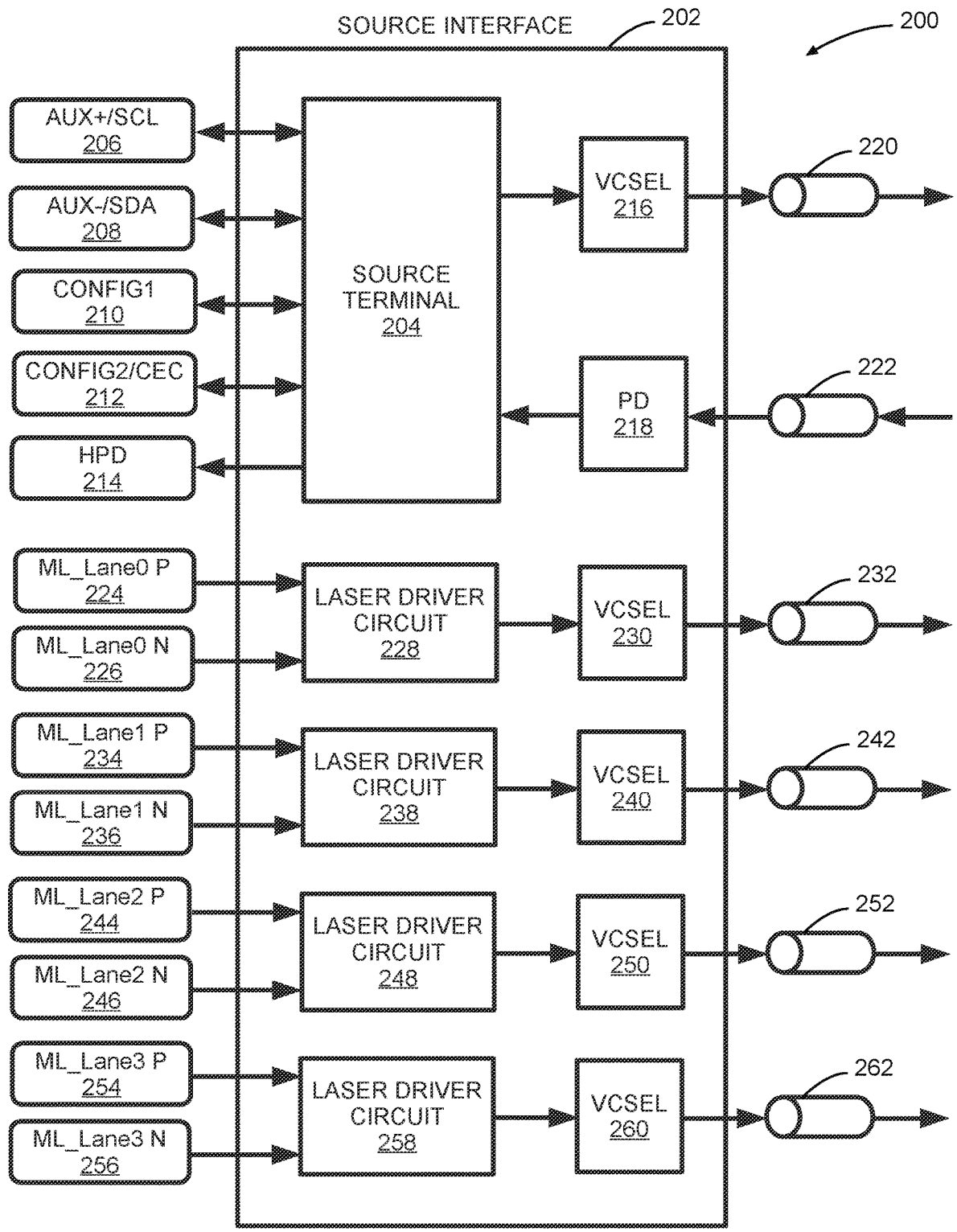
FIG. 2 is a block diagram depicting an example circuit architecture of a source optical interface.

FIG. 2 is a block diagram depicting an example circuit architecture of a source optical interface 200. As depicted, source optical interface 200 includes a source interface 202, an optical fiber 220, an optical fiber 222, an optical fiber 232, an optical fiber 242, an optical fiber 252, and an optical fiber 262. Source interface 202 may further include a source terminal 204, a laser driver circuit 228, a laser driver circuit 238, a laser driver circuit 248, a laser driver circuit 258, and a photodetector PD 218. Source interface 202 may also include one or more vertical-cavity surface-emitting lasers (VCSELs), such as a VCSEL 216, a VCSEL 230, a VCSEL 240, a VCSEL 250, and a VCSEL 260.

In an aspect, each of laser driver circuit 228 through 258 is configured to receive a pair of differential transition-minimized differential signaling (TMDS) signals associated with a DP signal or an HDMI signal, from a DP signal source or an HDMI signal source, respectively. For example, laser driver circuit 228 may receive an ML_Lane0 P 224 and an ML_Lane0 N 226 pair of signals; laser driver circuit 238 may receive a ML_Lane1 P 234 and a ML_Lane1 N 236 pair of signals; laser driver circuit 248 may receive a ML_Lane2 P 244 and a ML_Lane2 N 246 pair of signals; and laser driver circuit 258 may receive a ML_Lane3 P 254 and a ML_Lane3 N 256 pair of signals.

The DP signals ML_Lane0 P 224 through ML_Lane3 N 256 as depicted in FIG. 2 are associated with a DP mode of operation (i.e., transmission) by optical communication system 100 In other aspects, ML_Lane0 P 224 through ML_Lane3 N 256 are replaced by TMDS0+/− through TMDS3+/− signals (associated with an HDMI transmission protocol) if an HDMI transmission mode is selected by optical communication system 100. Specifically, ML_Lane0 P corresponds to TMDS0+, ML_Lane0 N corresponds to TMDS0−, ML_Lane1 P corresponds to TMDS1+, ML_Lane1 N corresponds to TMDS1−, ML_Lane2 P corresponds to TMDS2+, ML_Lane2 N corresponds to TMDS2−, ML_Lane3 P corresponds to TMDS3+, and ML_Lane3 N corresponds to TMDS3−.

In an aspect, each of laser driver circuit 228 through 258 may be configured to transmit each pair of ML_Lane signals when optical communication system 100 operates in a DP communication mode (also referred to herein as a "DP mode"). ML_Lane signal transmission may be performed over an optical fiber, via a VCSEL. Each VCSEL receives electrical signals corresponding to a ML_Lane signal pair from an associated laser driver circuit, converts the electrical signals to an optical signal, and transmits the optical signal over an optical fiber to a source interface. For example, laser driver circuit 228 may be configured to transmit ML_Lane0 P 224 and ML_Lane0 N 226 to VCSEL 230. VCSEL 230 converts ML_Lane0 P 224 and ML_Lane0 N 226 to an optical signal and transmits the optical signal over optical fiber 232. Laser driver circuit 238 may be configured to transmit ML_Lane1 P 234 and ML_Lane1 N 236 to VCSEL 240. VCSEL 240 converts ML_Lane1 P 234 and ML_Lane1 N 236 to an optical signal and transmits the optical signal over optical fiber 242. Laser driver circuit 248 may be configured to transmit ML_Lane2 P 244 and ML_Lane2 N 246 to VCSEL 250. VCSEL 250 converts ML_Lane2 P 244 and ML_Lane2 N 246 to an optical signal and transmits the optical signal over optical fiber 252. Laser driver circuit 258 may be configured to transmit ML_Lane3 P 254 and ML_Lane3 N 256 to VCSEL 260. VCSEL 260 converts ML Lane3 P 254 and ML_Lane3 N 256 to an optical signal and transmits the optical signal over optical fiber 262.

In an aspect, when optical communication system 100 operates in an HDMI signal transmission mode (also referred to herein as an "HDMI mode,") the above sequence of operations is performed with the DP signals ML_Lane 0 224 P through ML_Lane3 N signals replaced by corresponding HDMI TMDS signals.

In an aspect, source terminal 204 is configured to process, transmit, and receive one or more status and control signals (i.e., sideband/low-speed signals) associated with a DP communication protocol or an HDMI communication protocol, depending on a mode of operation of optical communication system 100. Examples of DP/HDMI status and control signals include AUX+/SCL 206, AUX−/SDA 208, CONFIG 210, CONFIG. 2/CEC 212, and hot plug detect (HPD) 214. In an aspect, source interface 202 may implement one or more functions that are similar to source interface 104. For example, the DP/HDMI status and control signals AUX+/SCL 206 through CONFIG. 2/CEC 212 may be received by source terminal 204 from master I2C/AUX 102. Source interface 102 may also be configured to transmit ML_LANE/TMDS signals; this functionality is not depicted in FIG. 1.

In an aspect, source terminal 204 is configured to transmit AUX+/SCL 206, AUX−/SDA 208, and CONFIG. 1 210, and CONFIG. 2/CEC to a sink interface, and receive HPD 214 from the sink interface. To further transmit (i.e., forward)

AUX+/SCL 206, AUX−/SDA 208, and CONFIG. 1 210, and CONFIG. 2/CEC, source terminal 204 may receive these signals as electrical signals. Source terminal 204 may perform processing (e.g., time-division multiplexing and/or other processing functions) on these signals, and transmit the processed signals to VCSEL 216. VCSEL 216 converts these signals into optical signals and transmits the optically-converted signals to the sink interface via optical fiber 220.

In an aspect, photodetector PD 218 may be configured to receive AUX+/SCL 206, AUX−/SDA 208, and CONFIG. 1 210, and CONFIG. 2/CEC, and HPD 214 as time-division multiplexed optical signals via optical fiber 222. PD 218 converts these optical signals into electrical signals and transmits these electrical signals to source terminal 204. Source terminal 204 may process these received electrical signals (e.g., perform time-division demultiplexing on the signals), and transmit these signals to master I2C/AUX 102.

In an aspect, transmission and reception of AUX+/SCL 206, AUX−/SDA 208, and CONFIG. 1 210, and CONFIG. 2/CEC and HPD 214 by source terminal 204 may be performed as separate operations, in a half-duplex manner.

Figure 3:
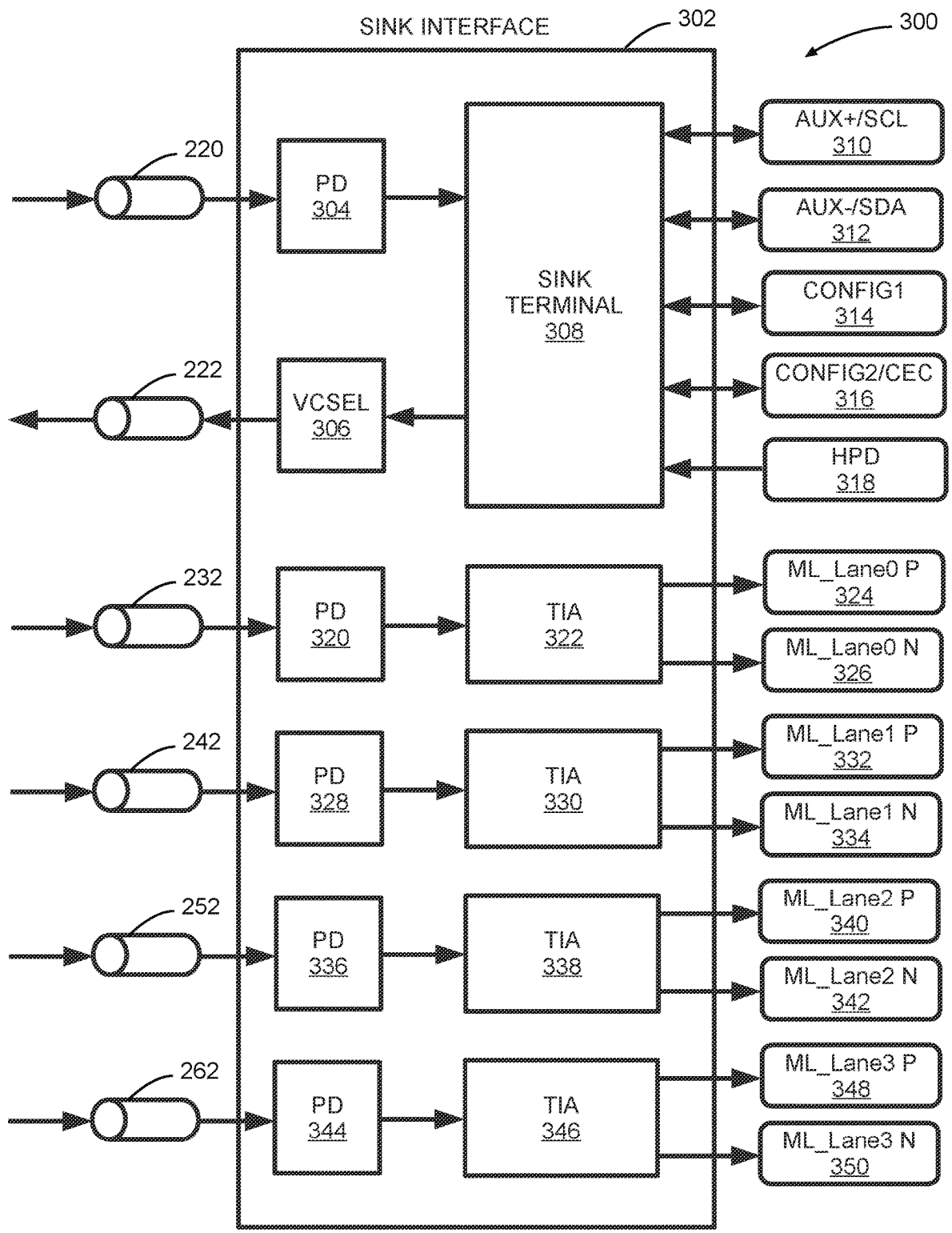
FIG. 3 is a block diagram depicting an example circuit architecture of a sink optical interface.

FIG. 3 is a block diagram depicting an example circuit architecture of a sink optical interface 300. As depicted, sink optical interface 300 includes a sink interface 302, optical fiber 220, optical fiber 222, optical fiber 232, optical fiber 242, optical fiber 252, and optical fiber 262. Sink interface 302 may further include a PD 304, a VCSEL 306, a PD 320, a PD 328, a PD 336, a PD 334, and a sink terminal 308. Sink interface 302 may also include one or more transimpedance amplifiers (TIAs) such as a TIA 322, a TIA 330, a TIA 338, and a TIA 346.

In an aspect, PD 320 is configured to receive an optical signal transmitted by VCSEL 230 over optical fiber 232; PD 328 is configured to receive an optical signal transmitted by VCSEL 240 over optical fiber 242; PD 336 is configured to receive an optical signal transmitted by VCSEL 250 over optical fiber 252; and PD 344 is configured to receive an optical signal transmitted by VCSEL 260 over optical fiber 262. Essentially, if optical communication system operates in a DP transmission mode, PD 320 receives an optical equivalent of ML_Lane0 P 224 and M_Lane0 N 226; PD 328 receives an optical equivalent of ML_Lane1 P 234 and ML_Lane1 N 236; PD 336 receives an optical equivalent of ML_Lane2 P 244 and ML_Lane2 N 246; and PD 344 receives an optical equivalent of ML_Lane3 P 254 and ML_Lane3 N 256. If optical communication system 100 operates in an HDMI transmission mode, the DP ML_Lane signals are replaced by their corresponding HDMI TMDS counterpart signals.

In an aspect, each of PD 320 through 344 converts the respective optical signal into an electrical counterpart, and transmits the associated electrical signal to a transimpedance amplifier (TIA). Each transimpedance amplifier amplifies the electrical signal and generates a DP/TMDS signal pair corresponding to a DP/TMDS signal pair received and transmitted by source interface 202, depending on whether a DP or HDMI mode of transmission is selected. For example, if a DP mode of transmission is selected, PD 320 transmits an electrical signal to TIA 322. TIA 322 amplifies the electrical signal and outputs a ML_Lane0 P 324 and a ML_Lane0 N 326 differential signal pair. The ML_Lane° P 324 and ML_Lane0 N 326 signals are received versions of the transmitted DP signal pair ML_Lane0 P 224 and ML_Lane0 N 226, respectively.

On the other hand, if an HDMI mode of transmission is selected, the ML_Lane signals are replaced by their corresponding TMDS counterparts, TMDS0+/−.

Also:

*PD 328 transmits an electrical signal to TIA 330. TIA 330 amplifies the electrical signal and outputs a ML_Lane1 P 332 and a ML_Lane1 N 334 differential signal pair. The ML_Lane1 P 332 and ML_Lane1 N 334 signals are received versions of the transmitted DP signal pair ML_Lane1 P 234 and ML_Lane1 N 236, respectively. For an HDMI mode of transmission, the ML_Lane signals are replaced by their corresponding TMDS counterparts, TMDS1+/−.

*PD 336 transmits an electrical signal to TIA 338. TIA 338 amplifies the electrical signal and outputs a ML_Lane2 P 340 and a ML_Lane2 N 342 differential signal pair. The ML_Lane2 P 340 and ML_Lane2 N 342 signals are received versions of the transmitted DP signal pair ML_Lane2 P 244 and ML_Lane2 N 246, respectively. For an HDMI mode of transmission, the ML_Lane signals are replaced by their corresponding TMDS counterparts, TMDS2+/−.

*PD 344 transmits an electrical signal to TIA 346. TIA 346 amplifies the electrical signal and outputs a ML_Lane3 P 348 and a ML_Lane3 N 350 differential signal pair. The ML_Lane3 P 348 and ML_Lane3 N 350 signals are received versions of the transmitted TMDS signal pair ML_Lane3 P 254 and ML_Lane3 N 256, respectively. For an HDMI mode of transmission, the ML_Lane signals are replaced by their corresponding TMDS counterparts, TMDS3+/−.

The TMDS signals—ML_Lane1 P 324 through ML_Lane3 N 350 are transmitted to slave I2C/AUX 108. For an HDMI mode of transmission, the ML_Lane signals are replaced by their corresponding TMDS counterparts, and transmitted to slave I2C/AUX 108.

In an aspect, time division-multiplexed signals AUX+/SCL 206, AUX−/SDA 208, CONFIG. 1 210, and CONFIG. 2/CEC 212 are received as optical signals by PD 304 via optical fiber 220. PD 304 may convert the optical signals to electrical signals and transmit these electrical signals to sink terminal 308. Sink terminal 308 may process the received signals. This processing can include time-division demultiplexing, among other operations. Sink terminal 308 can output the processed signals as separate signals, e.g., an AUX+/SCL 310, an AUX−/SDA 312, a CONFIG. 1 314, and a CONFIG. 2/CEC 316 that are received versions of AUX+/SCL 206, SDA 208, CONFIG. 1 210, and CONFIG. 2/CEC 212, respectively. Signals AUX+/SCL 310, AUX−/SDA 312, CONFIG. 1 314, and CONFIG. 2/CEC 316 may be transmitted as DP low-speed signals (AUX+/−, and CONFIG. 1/2) or as HDMI low-speed signals (SCL, SDA, and CEC) by sink terminal 308 to slave I2C/AUX 108. Slave I2C/AUX 108 may be associated with a DP sink in DP mode, or with an HDMI sink in HDMI mode.

In an aspect, sink terminal 308 receives AUX+/SCL 310, AUX−/SDA 312, CONFIG. 1 314, CONFIG. 2/CEC 316 and an HPD 318 signals from slave I2C/AUX 108. Sink terminal 308 may receive these signals as electrical signals. To further transmit (i.e., forward) the AUX+/SCL 310, AUX−/SDA 312, CONFIG. 1 314, CONFIG. 2/CEC 316 and HPD 318 signals, sink terminal 308 may perform processing (e.g., time-division multiplexing and/or other processing functions) on these signals, and transmit the processed signals to VCSEL 306. VCSEL 306 converts these signals into optical signals and transmits the optically-converted signals to the source interface via optical fiber 222. Ultimately, these signals are received by source interface 202 and output as AUX+/SCL 206, AUX−/SDA 208, CONFIG. 1 210, CONFIG. 2/CEC 212 and HPD 214 signals, respectively.

In an aspect, transmission and reception of AUX+/SCL 206, AUX−/SDA 208, CONFIG. 1 210, CONFIG. 2/CEC 212 and HDP 214 signals by sink terminal 308 may be performed as separate operations, in a half-duplex manner.

Figure 4:
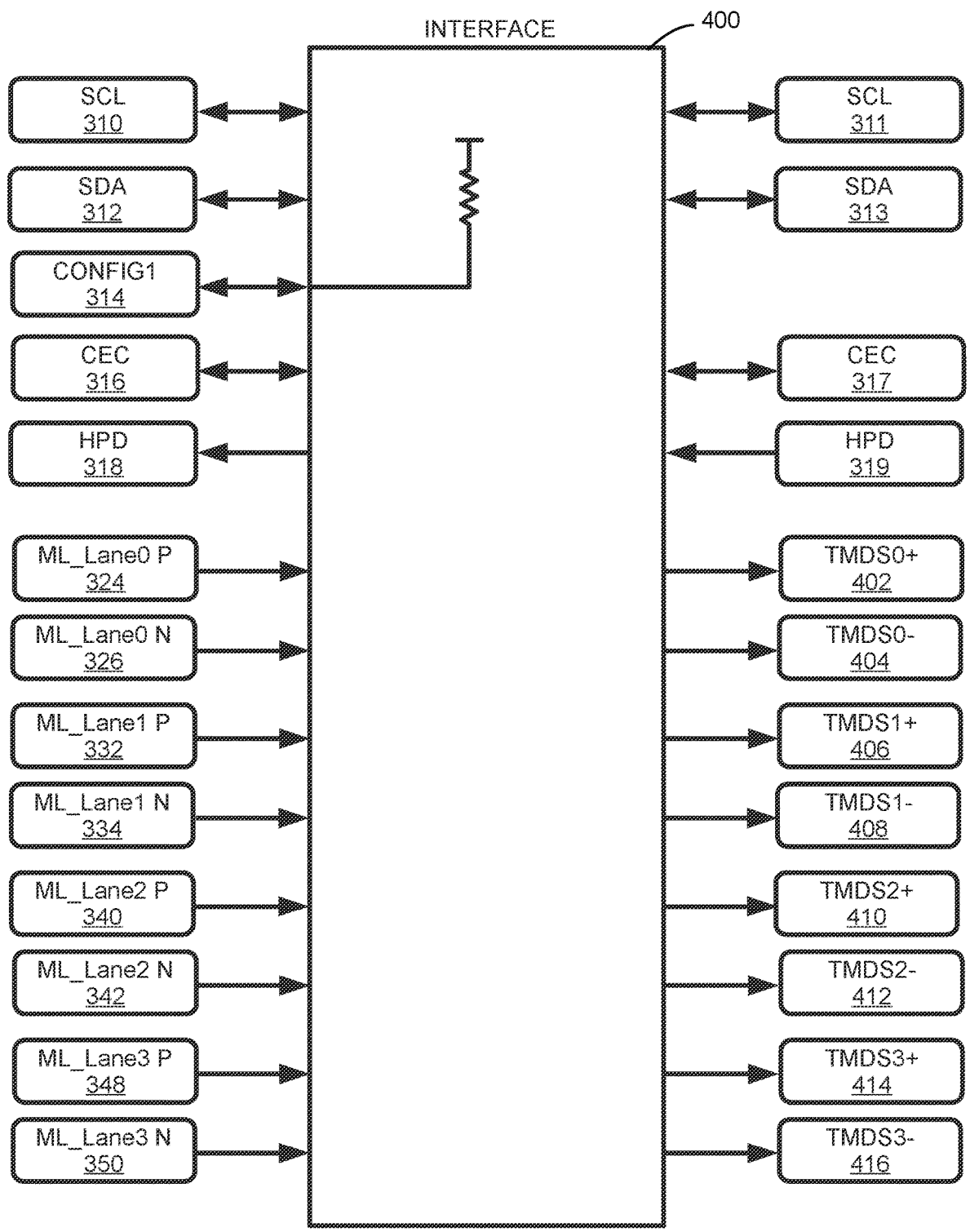
FIG. 4 is a block diagram depicting an example circuit architecture of an interface.

FIG. 4 is a block diagram depicting an example circuit architecture of an interface 400. In an aspect, interface 400 is used to mechanically connect (i.e., mechanically couple) a mechanical interface associated with sink interface 302 with an HDMI sink. Interface 400 functions as a DP/HDMI protocol conversion interface.

As depicted, interface 400 includes one or more pins configured to receive ML_Lane0 P 324 through ML_Lane3 N 350 signals as HDMI TMDS signals TMDS0+ through TMDS 3−. Interface 400 is configured to directly transmit these HDMI TMDS signals to an HDMI sink as:

*ML_Lane0 P 324 is transmitted as a TMDS0+ signal 402;
*ML_Lane0 N 326 is transmitted as a TMDS0− signal 404;
*ML_Lane1 P 332 is transmitted as a TMDS1+ signal 406;
*ML_Lane1 N 334 is transmitted as a TMDS1− signal 408;
*ML_Lane2 P 340 is transmitted as a TMDS2+ signal 410;
*ML_Lane2 N 342 is transmitted as a TMDS2− signal 412;
*ML_Lane3 P 348 is transmitted as a TMDS3+ signal 414;
*ML_Lane3 N 350 is transmitted as a TMDS3− signal 416.

In an aspect, interface 400 receives one or more HDMI control signals (i.e., HDMI low-speed signals) SCL 310, SDA 312, and CEC 316 from slave I2C/AUX 108, via sink interface 302. Since the DP CONFIG. 1 signal is not used in the HDMI protocol, the hardware signal pin on interface 400 that is associated with the CONFIG. 1 signal is pulled up to a source voltage (sometimes denoted as "VCC") via a 100kΩ pull-up resistor, as depicted.

Interface 400 may forward SCL 310, SDA 312, and CEC 316 as an SCL signal 311, an SDA signal 313, and a CEC signal 317, respectively, to an HDMI sink. Interface 400 may receive SCL 311, SDA 313, CEC 317, and HPD 319 from the HDMI sink, and forward these signals to slave I2C/AUX 108, via sink interface 302 as SCL 310, SDA 312, CEC 316, and HPD 318, respectively.

Figure 5:
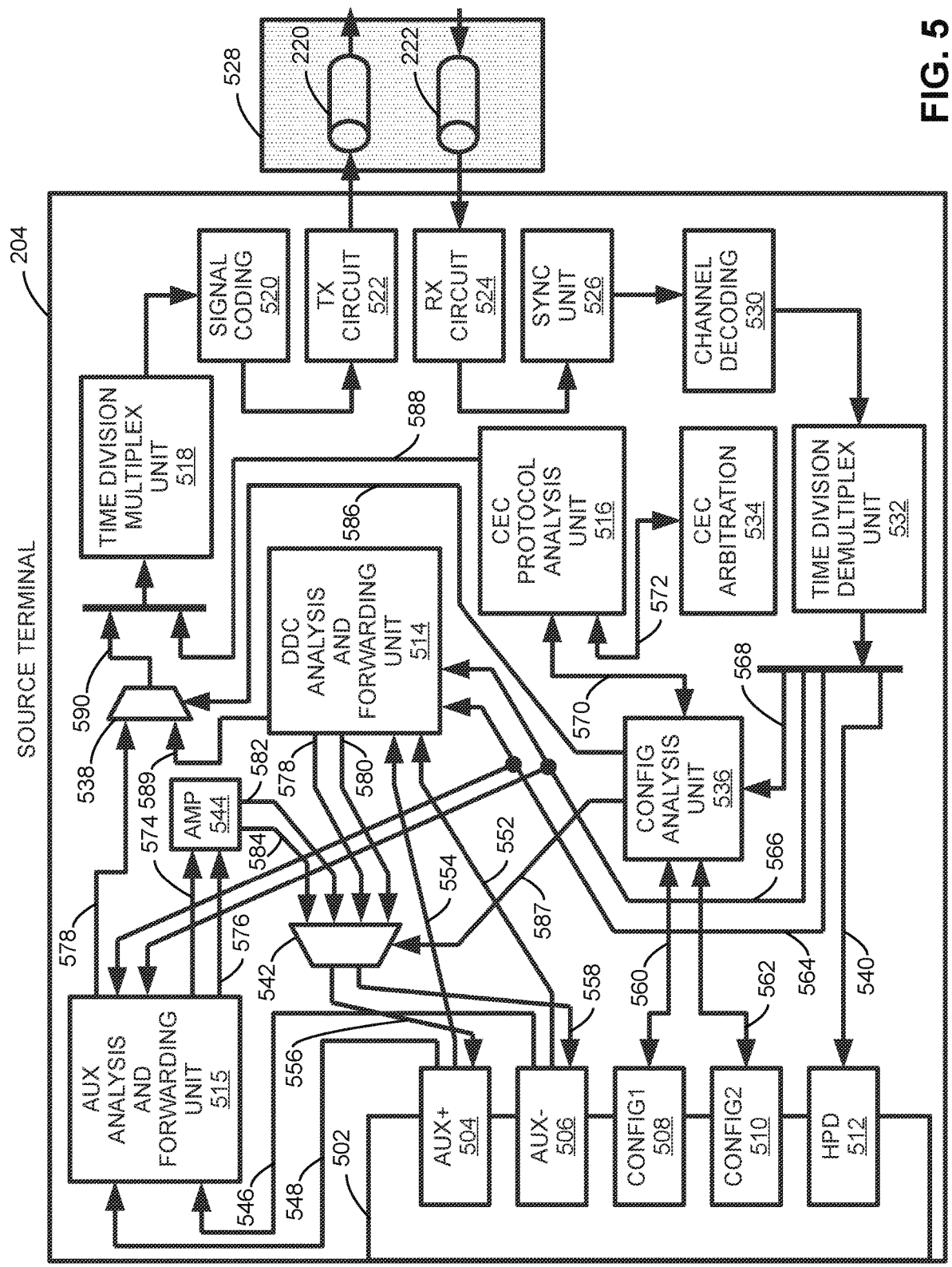
FIG. 5 is a block diagram depicting an example circuit architecture of a source terminal.

FIG. 5 is a block diagram depicting an example circuit architecture of source terminal 204. As depicted, source terminal 204 includes an interface 502, a DDC analysis and forwarding unit 514, an aux analysis and forwarding unit 515, a CEC protocol analysis unit 516, a time division multiplex unit 518, a signal coding 520, a transmit (TX) circuit 522, a receiver (RX) circuit 524, a synchronization (sync) unit 526, channel decoding 530, a time division demultiplex unit 532, a CEC arbitration 534, a config analysis unit 536, an amplifier AMP 544, a multiplexer 538, HPD 540, and a multiplexer 542. Interface 502 may further include an AUX+ interface 504, an AUX− interface 506, a CONFIG. 1 interface 508, a CONFIG. 2 interface 510, and an HPD interface 512. Source terminal 204 may be configured to send and receive signals via a bidirectional optical communication channel 528 comprising optical fiber 220 and optical fiber 222.

In an aspect, source terminal 204 is configured to send (transmit) and receive one or more DP control signals or one or more HDMI control signals over an optical communication channel (i.e., optical communication resources) that includes TX circuit 522, RX circuit 524, optical fiber 220 and optical fiber 222. In an aspect, the DP control signals include any combination of an AUX+ signal, an AUX− signal, a CONFIG. 1 signal, and an HPD signal. In an aspect, the HDMI control signals may include any combination of an SDA signal, an SCL signal, a CEC signal, and an HPD signal.

When source terminal 204 transmits and receives one or more DP control signals, source terminal 204 is defined as being in a "DP mode." When source terminal 204 transmits and receives one or more HDMI control signals, source terminal 204 is defined as being in an "HDMI mode." source terminal 204 may be configured to operate in either the DP mode or the HDMI mode.

A selection between a DP mode and an HDMI mode is done at source terminal 204 based on analyzing a source CONFIG. 1 signal 560 received from master I2C/AUX 102 and a sink CONFIG. 1 signal 568 received from sink terminal 308. Master I2C/AUX 102 may receive source CONFIG. 1 560 signal from a video source (i.e., a DP source or an HDMI source) connected to master I2C/AUX 102. Sink CONFIG. 1 signal 568 may be received from sink terminal 308 while being multiplexed with other signals. This set of multiplexed signals is received by RX circuit 524, synchronized using sync unit 526, decoded using channel decoding 530, and demultiplexed using time division demultiplex unit 532. In an aspect, source CONFIG. 1 signal 560 and sink CONFIG. 1 signal 568 are analyzed by config analysis unit 536. Based on the analysis, config analysis unit 536 may generate a protocol selection signal 586 and a protocol selection signal 587. Each of protocol selection signal 586 and 587 are used to switch source terminal 204 between the DP mode and the HDMI mode and configure communication between master I2C/AUX 102 and source interface 104 as either AUX communication or I2C communication, respectively. In other words, CONFIG. 1 signals/pins are used to determine whether communication between master I2C/AUX 102 and source interface 104 is either AUX communication or I2C communication.

DP Transmission Mode for Source Terminal

When source terminal 204 is in the DP mode, one or more DP control signals are transmitted by source terminal 204 using the optical communication resources. In this case, protocol control signals 586 and 587 are used to switch multiplexer 538 and 542, respectively, to enable source terminal 204 to transmit DP signals. Specifically, protocol control signal 586 may be used to switch multiplexer 538 to route signals from AUX analysis and forwarding unit 515 to time division multiplex unit 518. Protocol control signal 587 may be used to switch multiplexer 542 to route signals from AUX analysis and forwarding unit 515 to AUX+ interface 504 and AUX− interface 506.

Transmission of DP control signals by source terminal 204 may be accomplished by time-division multiplexing the DP control signals prior to transmission over the optical communication channel. The DP control signals may be transmitted to a sink terminal such as sink terminal 308. The DP control signals transmitted may be any combination of an AUX+ signal 548, and an AUX− signal 546. These signals are received from master I2C/AUX 102, via AUX+ interface 504 and AUX− interface 506, respectively.

In an aspect, one or more DP control signals are received by source terminal 204 using the optical communication resources. These DP control signals may be received from a sink terminal such as sink terminal 308. The DP control signals received may be any combination of an AUX+ signal 566 and an AUX− signal 564. In an aspect, these signals are received as optical signals over optical fiber 222, in a time-division multiplexed format. RX circuit 524 may include one or more photodetectors (e.g., PD 218) to convert the time-division multiplexed optical signals into time-division multiplexed electrical signals. The time-division multiplexed electrical signals are received by sync unit 526. Sync unit 526 is a synchronization unit that may be configured to perform bit synchronization and frame synchronization for the received signals.

In an aspect, when source terminal 204 operates in a DP mode, AUX+ interface 504 is configured to both transmit and receive an AUX+ signal; and AUX− interface 506 is configured to transmit and receive an AUX− signal, with each transmission and receiving being performed in a half-duplex manner. AUX+ interface 504 and AUX− interface 506 may be connected to AUX analysis and forwarding unit 515.

In an aspect, AUX analysis and forwarding unit 515 is configured to process display data channel (DDC) communication associated with source terminal 204. Under certain circumstances, a DP control signal (e.g., AUX+ signal 548) may be scheduled to be transmitted to a sink terminal by source terminal 204, at the same time that a DP control signal (e.g., AUX− signal 566) is received from the sink terminal. Since optical communication system 100 supports half-duplex communication, a scheduled transmission and a received signal cannot be transmitted simultaneously. This can lead to communication resource contention at source terminal 204, for each of the AUX+ signal and the AUX− signals (e.g., identified within unit 515). To address, and potentially preempt, any communication resource contention, the transmitted and received AUX+ and AUX− signals are processed by AUX analysis and forwarding unit 515.

In an aspect, when resolving any contention between AUX+ signal 548 (being transmitted to a sink terminal) and AUX+ signal 566 (being received from the sink terminal), AUX analysis and forwarding unit 515 may run a protocol analysis state machine that prioritizes a transmission of AUX+ signal 548 over a reception of AUX+ signal 566. In other words, for source terminal 204, AUX+ signal transmission is temporally prioritized over AUX+ signal reception. AUX analysis and forwarding unit 515 may transmit AUX+ signal 548 in substantially real time at an interval of a local clock.

In an aspect, when resolving any contention between AUX− signal 546 (being transmitted to a sink terminal) and AUX− signal 564 (being received from the sink terminal and routed to AUX analysis and forwarding unit 515), AUX analysis and forwarding unit 515 may run a protocol analysis state machine that prioritizes a transmission of AUX− signal 546 over a reception of AUX− signal 564. In other words, for source terminal 204, AUX− signal transmission is temporally prioritized over AUX− signal reception. AUX analysis and forwarding unit 515 may transmit AUX− signal 546 in substantially real time at an interval of a local clock.

In an aspect, time division multiplex unit 518 receives AUX+ and AUX− signals to be transmitted from AUX analysis and forwarding unit 515. Time division multiplex unit 518 may be configured to cyclically collect and combine an AUX+ signal and an AUX− signal (collectively depicted as a signal 578) to be transmitted from AUX analysis and forwarding unit 515. Signal 578 is selected by multiplexer 538 under command from config analysis unit 536 and transmitted as a signal 590, in accordance with the DP mode. In an aspect, the AUX+ and AUX− signals to be transmitted may be combined in any arbitrary temporal arrangement.

The time-division multiplexed signals generated by time division multiplex unit 518 may be output to signal coding 520. Signal coding 520 may be configured to perform Manchester encoding on the time-division multiplexed signals. This enables synchronization between source terminal 204 and sink terminal 308. An output from signal coding 520 is transmitted to TX circuit 522. TX circuit 522 is a transmission (transmit) circuit that is configured to convert one or more electrical signals (containing the time-division multiplexed AUX+ and AUX− signals) into optical signals for transmission over optical fiber 220. To achieve this functionality, TX circuit 522 may include one or more VCSELs (e.g., VCSEL 216).

In an aspect, once the AUX+ and AUX− signals (e.g., AUX+ signal 548, and AUX− signal 546) have been transmitted, the received AUX+ and AUX− signals (e.g., AUX+ signal 566 and AUX− signal 564) are output from AUX analysis and forwarding unit 515 as an AUX+ signal 574 and an AUX− signal 576. AMP 544 amplifies AUX+ signal 574 and AUX− signal 576 to generate an AUX+ signal 556 and an AUX− signal 558, respectively. The AUX+ signal 556 and AUX− signal 558 are respectively forwarded to AUX+ interface 504 and AUX− interface 506, respectively. These AUX+ signal 556 and AUX− signal 558 are respectively transmitted from AUX+ interface 504 and AUX− interface 506 to master I2C/AUX 102. In this way, half-duplex communication of the DP AUX+ and AUX− signals using one or more optical resources is accomplished.

In one aspect, one or more DP signals are received by source terminal 204 from a sink terminal via optical fiber 222. The received signals may include AUX+ signal 566, AUX− signal 564, and an HPD signal 540. These signals may be received in a time-division multiplexed format, as an optical signal. RX circuit 524 may convert this optical signal into an electrical signal using one or more photodetectors (e.g., PD 218). The electrical signal may be received by channel decoding 530 that is configured to convert any received signals that are Manchester-encoded into non-Manchester-encoded signals.

In an aspect, an output of channel decoding 530 is received by time division demultiplex unit 532 that is configured to time-division demultiplex the received signals, into:

*AUX+ signal 566 that is transmitted to AUX analysis and forwarding unit 515;
*AUX− signal 564 that is transmitted to AUX analysis and forwarding unit 515; and
*HPD signal 540 that is transmitted to HPD interface 512 for further transmission to master I2C/AUX 102.

In an aspect, CONFIG 1 signal 314 is used for determining whether to select the DP mode, or to select an HDMI mode. CONFIG. 2 signal 562 is not used in the DP mode. In general, AUX+ interface 504, AUX− interface 506, CONFIG. 1 interface 508, and CONFIG. 2 interface 510 are bidirectional, while HPD interface 512 is unidirectional, being a receive-only interface.

HDMI Transmission Mode for Source Terminal

When source terminal 204 is in the HDMI mode, one or more HDMI control signals are transmitted by source terminal 204 using the optical communication resources. In this case, protocol control signals 586 and 587 are used to switch multiplexer 538 and 542, respectively, to enable source terminal 204 to transmit HDMI signals. Specifically, protocol control signal 586 may be used to switch multiplexer 538 to route signals from DDC analysis and forwarding unit 514 to time division multiplex unit 518. Protocol control signal 587 may be used to switch multiplexer 542 to route signals from DDC analysis and forwarding unit 514 to AUX+ interface 504 and AUX− interface 506.

Transmission of HDMI control signals by source terminal 204 may be accomplished by time-division multiplexing the HDMI control signals prior to transmission over the optical communication channel. The HDMI control signals may be transmitted to a sink terminal such as sink terminal 308. The HDMI control signals transmitted may be any combination of an SCL signal 554, an SDA signal 552, and a CEC signal 562. These signals are received from master I2C/AUX 102, via AUX+ interface 504, AU− interface 506, and CONFIG. 2 interface 510, respectively. In HDMI mode, AUX+ interface 504, AUX− interface 506, and CONFIG. 2 interface 510 may respectively serve as interfaces for the HDMI SCL, SDA, and CEC signals.

In an aspect, one or more HDMI control signals are received by source terminal 204 using the optical communication resources. These HDMI control signals may be received from a sink terminal such as sink terminal 308. The HDMI control signals received may be any combination of an SCL signal 566, an SDA signal 564, a CEC signal 568, and HPD signal 540. In an aspect, these signals are received as optical signals over optical fiber 222, in a time-division multiplexed format. RX circuit 524 may include one or more photodetectors (e.g., PD 218) to convert the time-division multiplexed optical signals into time-division multiplexed electrical signals. The time-division multiplexed electrical signals are received by sync unit 526. Sync unit 526 is a synchronization unit that may be configured to perform bit synchronization and frame synchronization for the received signals.

In an aspect, when source terminal 204 operates in an HDMI mode, AUX+ interface 504 is configured to both transmit and receive an SCL signal; AUX− interface 506 is configured to transmit and receive an SDA signal; and CONFIG. 2 interface 510 is configured to transmit and receive a CEC signal, with each transmission and receiving being performed in a half-duplex manner. AUX+ interface 504 and AUX− interface 506 may be connected to DDC analysis and forwarding unit 514. CONFIG. 2 interface 510 may be connected to config analysis unit 536. Since config analysis unit 536 has determined that source terminal 204 is operating in HDMI mode, config analysis unit 536 may forward one or more CEC signals between CONFIG. 2 interface 510 and CEC protocol analysis unit 516. In other words, in HDMI mode, CONFIG. 2 interface 510 is connected to CEC protocol analysis unit 516 via config analysis unit 536.

In an aspect, DDC analysis and forwarding unit 514 is configured to process DDC communication associated with source terminal 204. CEC protocol analysis unit 514 may be configured to process CEC communication associated with source terminal 204. In an aspect, CEC arbitration 534 may be connected to CEC decoding and forwarding unit 516 and may be configured to perform CEC arbitration and prevent CEC signal conflicts.

Under certain circumstances, an HDMI control signal may be scheduled to be transmitted to a sink terminal by source terminal 204, at the same time that an HDMI control signal is received from the sink terminal. This can lead to communication resource contention at source terminal 204, for each of the SCL signal, the SDA signal, and the CEC signal (e.g., identified within unit 514 or unit 516). To address, and potentially preempt, any communication resource contention, the transmitted and received SCL and SDA signals are processed by DDC analysis and forwarding unit 514, while the transmitted and received CEC signals are processed by CEC decoding and forwarding unit 516 and CEC arbitration 534.

In an aspect, when resolving any contention between SCL signal 554 (being transmitted to an HMDI sink terminal) and SCL signal 566 (being received from the sink terminal), DDC analysis and forwarding unit 514 may run a protocol analysis state machine that prioritizes a transmission of SCL signal 554 over a reception of SCL signal 566. In other words, for source terminal 204, SCL signal transmission is temporally prioritized over SCL signal reception. DDC analysis and forwarding unit 514 may transmit SCL signal 554 in substantially real time at an interval of a local clock.

In an aspect, when resolving any contention between SDA signal 552 (being transmitted to an HMDI sink terminal) and SDA signal 564 (being received from the HMDI sink terminal), DDC analysis and forwarding unit 514 may run a protocol analysis state machine that prioritizes a transmission of SDA signal 552 over a reception of SDA signal 564. In other words, for source terminal 204, SDA signal transmission is temporally prioritized over SDA signal reception. DDC analysis and forwarding unit 514 may transmit SDA signal 552 in substantially real time at an interval of a local clock.

In an aspect, when resolving any contention between CEC signal 562 (being transmitted to an HMDI sink terminal) and CEC signal 568 (being received from the HMDI sink terminal), CEC decoding and forwarding unit 516 may run a protocol analysis state machine that prioritizes a transmission of CEC signal 562 (received from config analysis unit 536 as a CEC signal 570) over a reception of CEC signal 568. To accomplish this, CEC protocol analysis unit 516 may transmit and receive a CEC signal 572 from CEC arbitration unit 534. In an aspect, the protocol analysis state machine is implemented in CEC protocol analysis unit 516. The CEC protocol analysis state machine may perform CEC arbitration to resolve contention on the CEC bus. In other words, for source terminal 204, CEC signal transmission is temporally prioritized over CEC signal reception. CEC decoding and forwarding unit 516 may transmit CEC signal 562 in substantially real time at an interval of a local clock.

In an aspect, time division multiplex unit 518 receives SCL and SDA signals to be transmitted from DDC analysis and forwarding unit 514, and a CEC signal to be transmitted from CEC decoding and forwarding unit 516. Time division multiplex unit 518 may be configured to cyclically collect and combine an SCL signal and an SDA signal (collectively depicted as a signal 589) to be transmitted from DDC analysis and forwarding unit 514, and a CEC signal 588 to be transmitted from CEC protocol analysis unit 516. Signal 589 is selected by multiplexer 538 under command from config analysis unit 536 and transmitted as signal 590, in accordance with the HDMI mode. Signals 588 and 589 may be combined into a single-channel signal using time-division multiplexing. In an aspect, the SCL, SDA, and CEC signals to be transmitted may be combined in any arbitrary temporal arrangement.

The time-division multiplexed signals generated by time division multiplex unit 518 may be output to signal coding 520. Signal coding 520 may be configured to perform Manchester encoding on the time-division multiplexed signals. This enables synchronization between source terminal 204 and sink terminal 308. An output from signal coding 520 is transmitted to TX circuit 522. TX circuit 522 is a transmission (transmit) circuit that is configured to convert one or more electrical signals (containing the time-division multiplexed SCL, SDA and CEC signals) into optical signals for transmission over optical fiber 220. To achieve this functionality, TX circuit 522 may include one or more VCSELs (e.g., VCSEL 216).

In an aspect, once the SCL, SDA and CEC signals (e.g., SCL signal 554, SDA signal 552, and CEC signal 588) have been transmitted, the received SCL and SDA signals (e.g., SCL signal 556, SDA signal 558) may be transmitted from DDC analysis and forwarding unit 514 to AUX+ interface 504 and AUX− interface 506, respectively. Also, the received CEC signal (e.g., CEC signal 568) received from the sink terminal may be transmitted from CEC config analysis unit 536, to CONFIG. 2 interface 510. These SCL, SDA, and CEC signals are respectively transmitted from AUX+ interface 504, AUX− interface 506, and CONFIG. 2 interface 510, to master I2C/AUX 102. In this way, half-duplex communication of the HDMI SCL, SDA and CEC signals using one or more optical resources is accomplished.

In one aspect, one or more HDMI signals are received by source terminal 204 from a sink terminal via optical fiber 222. The received signals may include SCL signal 566, SDA signal 564, CEC signal 568, and HPD signal 540. These signals may be received in a time-division multiplexed format, as an optical signal. RX circuit 524 may convert this optical signal into an electrical signal using one or more photodetectors (e.g., PD 218). The electrical signal may be received by channel decoding 530 that is configured to convert any received signals that are Manchester-encoded into non-Manchester-encoded signals.

In an aspect, an output of channel decoding 530 is received by time division demultiplex unit 532 that is configured to time-division demultiplex the received signals, into:

*SCL signal 566 that is transmitted to DDC analysis and forwarding unit 514;

*SDA signal 564 that is transmitted to DDC analysis and forwarding unit 514;

*CEC signal 568 that is transmitted to config analysis unit 536; and

*HPD signal 540 that is transmitted to HPD interface 512 for further transmission to master I2C/AUX 102.

As depicted in FIG. 4, CONFIG 1 signal 314 is not used as an HDMI control signal in HDMI mode; hence, CONFIG. 1 interface 508 is not used in HDMI mode, other than for determining whether to select the HDMI mode, or to select a DP mode. In general, AUX+ interface 504, AUX− interface 506, CONFIG. 1 interface 508, and CONFIG. 2 interface 510 are bidirectional, while HPD interface 512 is unidirectional, being a receive-only interface.

Figure 6:
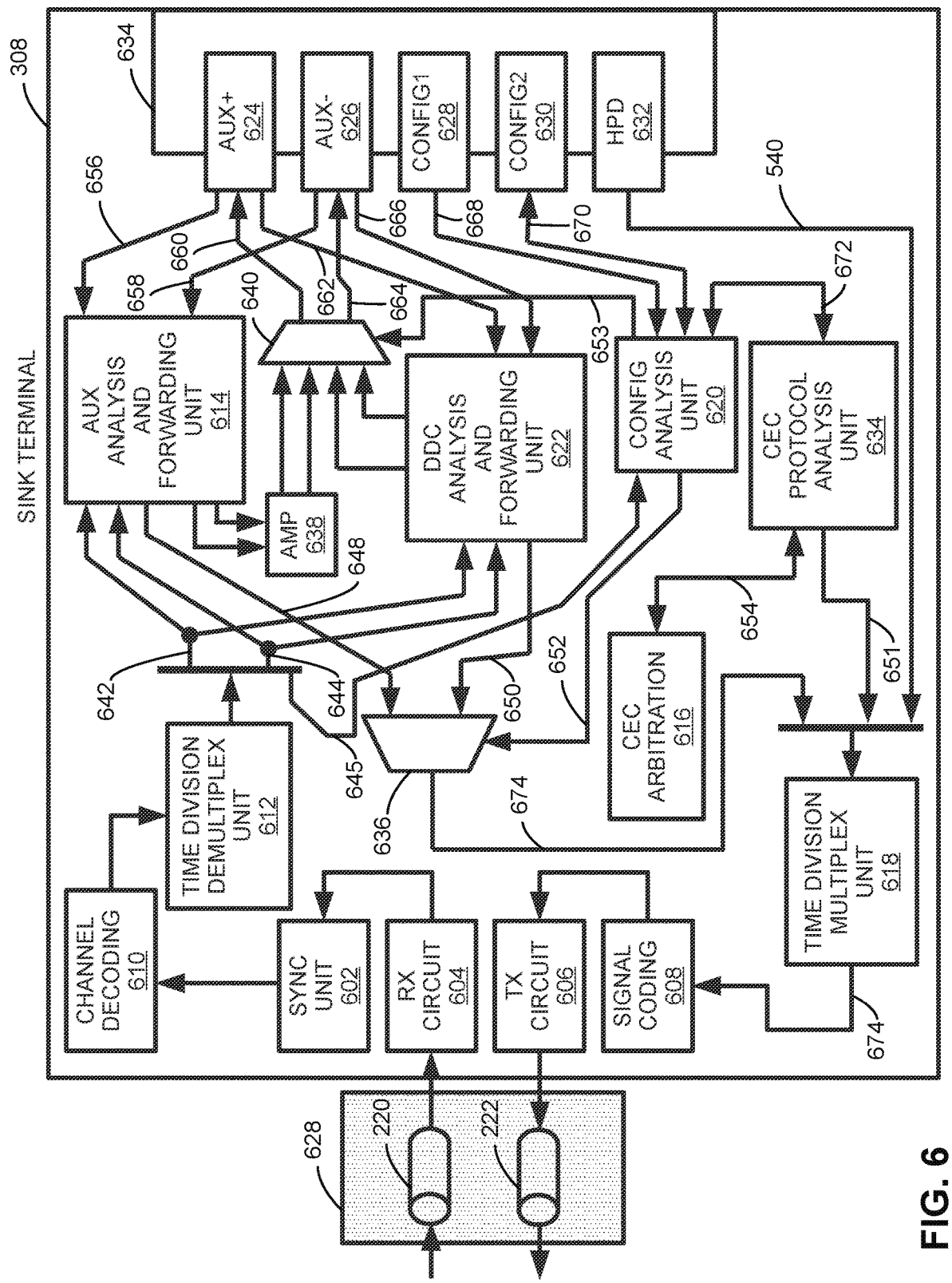
FIG. 6 is a block diagram depicting an example circuit architecture of a sink terminal.

FIG. 6 is a block diagram depicting an example circuit architecture of sink terminal 308. As depicted, sink terminal 308 includes a channel decoding 610, a sync unit 602, a receive (RX) circuit 604, a transmit (TX) circuit 606, a signal coding 608, a time division demultiplex unit 612, a time division multiplex unit 618, a CEC arbitration 616, an AUX analysis and forwarding unit 614, a DDC analysis and forwarding unit 622, a CEC analysis and forwarding unit 620, an interface 534, an AUX+interface 624, an AUX− interface 626, a CONFIG. 1 interface 628, a CONFIG. 2 interface 630, an HPD interface 632, an amplifier AMP 638, a multiplexer 636, and a multiplexer 640. Sink terminal 308 may be configured to send and receive signals via bidirectional optical communication channel 428 comprising optical fiber 220 and optical fiber 222.

In an aspect, sink terminal 308 is configured to send (transmit) and receive one or more DP control signals or one or more HDMI control signals over an optical communication channel (i.e., optical communication resources) that includes TX circuit 606, RX circuit 604, optical fiber 220 and optical fiber 222. In an aspect, the DP control signals may include any combination of an AUX+ signal, an AUX− signal, a CONFIG. 1 signal, and an HPD signal. In an aspect, the HDMI control signals may include any combination of an SCL signal, an SDA signal, a CEC signal, and an HPD signal.

When sink terminal 308 transmits and receives one or more DP control signals, sink terminal 308 is defined as being in a "DP mode." When sink terminal 308 transmits and receives one or more HDMI control signals, sink terminal 308 is defined as being in an "HDMI mode." D sink terminal 308 may be configured to operate in either the DP mode or the HDMI mode. A selection between a DP mode and an HDMI mode is done at sink terminal 308 based on analyzing a sink CONFIG. 1 signal 668 received from slave I2C/AUX 108 and a source CONFIG. 1 signal 645 received from sink terminal 308. Slave I2C/AUX 108 may receive source CONFIG. 1 645 signal from a video source (i.e., a DP source or an HDMI source) connected to slave I2C/AUX 108. Source CONFIG. 1 signal 645 may be received from source terminal 204 while being multiplexed with other signals. This set of multiplexed signals is received by RX circuit 604, synchronized using sync unit 602, decoded using channel decoding 610, and demultiplexed using time division demultiplex unit 612. In an aspect, source CONFIG. 1 signal 645 and sink CONFIG. 1 signal 668 are analyzed by config analysis unit 620. Based on the analysis, config analysis unit 620 may generate a protocol selection signal 652 and a protocol selection signal 653. Each of protocol selection signal 652 and 653 are used to sink source terminal 308 between the DP mode and the HDMI mode and configure communication between slave I2X/AUX 108 and sink interface 106 as either AUX communication or I2C communication, respectively. In other words, CONFIG. 1 signals/pins are used to determine whether communication between slave I2C/AUX 108 and sink interface 106 is either AUX communication or I2C communication.

DP Transmission Mode for Sink Terminal

When sink terminal 308 is in the DP mode, one or more DP control signals are transmitted by sink terminal 308 using the optical communication resources. In this case, protocol control signals 652 and 653 are used to switch multiplexer 636 and 640, respectively, to enable sink terminal 308 to transmit DP signals. Specifically, protocol control signal 652 may be used to switch multiplexer 636 to route signals from AUX analysis and forwarding unit 614 to time division multiplex unit 618. Protocol control signal 653 may be used to switch multiplexer 640 to route signals from AUX analysis and forwarding unit 614 to AUX+ interface 624 and AUX− interface 626.

Transmission of DP control signals by sink terminal 308 may be accomplished by time-division multiplexing the DP control signals prior to transmission over the optical communication channel. The DP control signals may be transmitted to a source terminal such as source terminal 204. The DP control signals transmitted may be any combination of an AUX+ signal 662, an AUX− signal 658, and HPD signal 540. These signals are received from slave I2C/AUX 108, via AUX+ interface 624, AUX− interface 626, and HPD interface 632, respectively.

In an aspect, one or more DP control signals are received by sink terminal 308 using the optical communication resources. These DP control signals may be received from a source terminal such as source terminal 204. The DP control signals received may be any combination of an AUX+ signal 642 and an AUX− signal 644. In an aspect, these signals are received as optical signals over optical fiber 220, in a time-division multiplexed format. RX circuit 604 may include one or more photodetectors (e.g., PD 304) to convert the time-division multiplexed optical signals into time-division multiplexed electrical signals. The time-division multiplexed electrical signals are received by sync unit 602. Sync unit 602 is a synchronization unit that may be configured to perform bit synchronization and frame synchronization for the received signals.

In an aspect, when sink terminal 308 operates in an DP mode, AUX+ interface 624 is configured to both transmit and receive an AUX+ signal; and AUX− interface 626 is configured to transmit and receive an AUX− signal, with each transmission and receiving being performed in a half-duplex manner. AUX+ interface 624 and AUX− interface 626 may be connected to AUX analysis and forwarding unit 614.

In an aspect, AUX analysis and forwarding unit 614 is configured to process DDC communication associated with sink terminal 308. Under certain circumstances, a DP control signal may be scheduled to be transmitted to a source terminal by sink terminal 308, at the same time that a DP control signal is received from the source terminal. This can lead to communication resource contention at sink terminal 308, for each of the AUX+ signal and the AUX− signals (e.g., identified within unit 614). To address, and potentially preempt, any communication resource contention, the transmitted and received AUX+ and AUX− signals are processed by AUX analysis and forwarding unit 614.

In an aspect, when resolving any contention between AUX+ signal 656 (being transmitted to a source terminal) and AUX+ signal 642 (being received from the source terminal), AUX analysis and forwarding unit 614 may run a protocol analysis state machine that prioritizes a reception of AUX+ signal 642 over a transmission of AUX+ signal 656. In other words, for sink terminal 308, AUX+ signal reception is temporally prioritized over AUX+ signal transmission. AUX analysis and forwarding unit 614 may transmit AUX+ signal 656 in substantially real time at an interval of a local clock.

In an aspect, when resolving any contention between AUX− signal 658 (being transmitted to a source terminal) and AUX− signal 644 (being received from the sink terminal), AUX analysis and forwarding unit 614 may run a protocol analysis state machine that prioritizes a reception of AUX− signal 644 over a transmission of AUX− signal 658. In other words, for sink terminal 308, AUX− signal reception is temporally prioritized over AUX− signal transmission. AUX analysis and forwarding unit 614 may transmit AUX− signal 658 in substantially real time at an interval of a local clock.

In an aspect, time division multiplex unit 618 receives AUX+ and AUX− signals to be transmitted from AUX analysis and forwarding unit 614. Time division multiplex unit 518 may be configured to cyclically collect and combine an AUX+ signal and an AUX− signal (collectively depicted as a signal 648) to be transmitted from AUX analysis and forwarding unit 614. Signal 648 is selected by multiplexer 636 under command from config analysis unit 620, and transmitted as a signal 674, in accordance with the DP mode. In an aspect, the AUX+ and AUX− signals to be transmitted may be multiplexed/combined in any arbitrary temporal arrangement with HPD signal 540 received from slave I2C/AUX 108, via HPD interface 632.

The time-division multiplexed signals generated by time division multiplex unit 618 may be output to signal coding 608 as signal 674. Signal coding 608 may be configured to perform Manchester encoding on the time-division multiplexed signals comprising signal 674. This enables synchronization between sink terminal 308 and source terminal 204. An output from signal coding 608 is transmitted to TX circuit 606. TX circuit 606 is a transmission (transmit) circuit that is configured to convert one or more electrical signals (containing the time-division multiplexed AUX+, AUX− and HPD signals) into optical signals for transmission over optical fiber 222. To achieve this functionality, TX circuit 606 may include one or more VCSELs (e.g., VCSEL 306).

In one aspect, one or more DP signals are received by sink terminal 308 from a source terminal via optical fiber 220. The received signals may include AUX+ signal 642, and AUX− signal 644. These signals may be received in a time-division multiplexed format, as an optical signal. RX circuit 604 may convert this optical signal into an electrical signal using one or more photodetectors (e.g., PD 304). The electrical signal may be received by channel decoding 610 that is configured to convert any received signals that are Manchester-encoded into non-Manchester-encoded signals.

In an aspect, an output of channel decoding 610 is received by time division demultiplex unit 612 that is configured to time-division demultiplex the received signals, into:

\*AUX+ signal 642 that is transmitted to AUX analysis and forwarding unit 614; and \*AUX− signal 644 that is transmitted to AUX analysis and forwarding unit 614.

In an aspect, once the AUX+ and AUX− signals (e.g., AUX+ signal 642, and AUX− signal 644) have been received, AUX analysis and forwarding unit 614 outputs these signals to amplifier AMP 638, that amplifies AUX+ signal 642 and AUX− signal 644 and outputs the amplified signals to multiplexer 640. Multiplexer 640 is enabled in DP mode to forward AUX+ signal 642 and AUX− signal 644 to AUX+ interface 624 and AUX− interface 626, as an AUX+ signal 660 and an AUX− signal 664, respectively. AUX+ signal 660 and an AUX− signal 664 may then be transferred to slave I2C/AUX 108.

Subsequent to receiving AUX+ signal 660 and AUX− signal 664, signal 674 that is comprised of an AUX+ signal and an AUX− signal may be time-division multiplexed with each other with HPD signal 540, by time division multiplex unit 618, and then transmitted to sink terminal 204. In this way, half-duplex communication of the DP AUX+ and AUX− signals using one or more optical resources is accomplished.

In an aspect, CONFIG 1 signal 314 is used for determining whether to select the DP mode, or to select an HDMI mode. CONFIG. 2 signal 670 is not used in the DP mode. In general, AUX+ interface 624, AUX− interface 626, CONFIG. 1 interface 628, and CONFIG. 2 interface 630 are bidirectional, while HPD interface 632 is unidirectional, being a transmit-only interface.

HDMI Transmission Mode for Sink Terminal

When sink terminal 308 is in the HDMI mode, one or more HDMI control signals are transmitted by sink terminal 308 using the optical communication resources. In this case, protocol control signals 652 and 653 are used to switch multiplexer 636 and 640, respectively, to enable sink terminal 308 to transmit HDMI signals. Specifically, protocol control signal 652 may be used to switch multiplexer 636 to route signals from DDC analysis and forwarding unit 622 to time division multiplex unit 618. Protocol control signal 653 may be used to switch multiplexer 640 to route signals from DDC analysis and forwarding unit 614 to AUX+ interface 624 and AUX− interface 626.

Transmission of HDMI control signals by sink terminal 308 may be accomplished by time-division multiplexing the HDMI control signals prior to transmission over the optical communication channel. The HDMI control signals may be transmitted to a source terminal such as source terminal 204. The HDMI control signals transmitted may be any combination of an SCL signal 662, an SDA signal 666, a CEC signal 670, and HPD signal 540. These signals are received from slave I2C/AUX 108, via AUX+interface 624, AUX− interface 626, CONFIG. 2 interface 630, and HPD interface 632, respectively. In HDMI mode, AUX+ interface 624, AUX− interface 626, and CONFIG. 2 interface 630 may respectively serve as interfaces for the HDMI SCL, SDA, and CEC signals.

In an aspect, one or more HDMI control signals are be received by sink terminal 308 using the optical communication resources. These HDMI control signals may be received from a source terminal such as source terminal 204. The HDMI control signals received may be any combination of an SCL signal 660, an SDA signal 664, and a CEC signal 670. In an aspect, these signals are received as optical signals over optical fiber 220, in a time-division multiplexed format. RX circuit 604 may include one or more photodetectors (e.g., PD 304) to convert the time-division multiplexed optical signals into time-division multiplexed electrical signals. The time-division multiplexed electrical signals are received by sync unit 602. Sync unit 602 is a synchronization unit that may be configured to perform bit synchronization and frame synchronization for the received signals.

In an aspect, when sink terminal 308 operates in an HDMI mode, AUX+ interface 624 is configured to both transmit and receive an SCL signal; AUX− interface 626 is configured to transmit and receive an SDA signal; and CONFIG. 2 interface 630 is configured to transmit and receive a CEC signal, with each transmission and receiving being performed in a half-duplex manner. AUX+ interface 624 and AUX− interface 626 may be connected to DDC analysis and forwarding unit 622. CONFIG. 2 interface 630 may be connected to config analysis unit 620. Since config analysis unit 620 has determined that sink terminal 308 is operating in HDMI mode, config analysis unit 620 may forward one or more CEC signals between CONFIG. 2 interface 630 and CEC protocol analysis unit 634. In other words, in HDMI mode, CONFIG. 2 interface 630 is connected to CEC protocol analysis unit 634 via config analysis unit 620.

In an aspect, DDC analysis and forwarding unit 622 is configured to process DDC communication associated with sink terminal 308. CEC protocol analysis unit 634 may be configured to process CEC communication associated with sink terminal 308. In an aspect, CEC arbitration 616 may be connected to CEC protocol analysis unit 634 and may be configured to perform CEC arbitration and prevent CEC signal conflicts.

Under certain circumstances, an HDMI control signal may be scheduled to be transmitted to a source terminal by sink terminal 308, at the same time that an HDMI control signal is received from the source terminal. This can lead to communication resource contention at sink terminal 308, for each of the SCL signal, the SDA signal, and the CEC signal (e.g., identified within unit 622 or unit 634). To address, and potentially preempt, any communication resource contention, the transmitted and received SCL and SDA signals are processed by DDC analysis and forwarding unit 622, while the transmitted and received CEC signals are processed by CEC protocol analysis unit 634 and CEC arbitration 616.

In an aspect, when resolving any contention between SCL signal 662 (being transmitted to an HMDI source terminal) and SCL signal 660 (being received from the source terminal), DDC analysis and forwarding unit 622 may run a protocol analysis state machine that prioritizes a reception of SCL signal 660 over a transmission of SCL signal 662. In other words, for sink terminal 308, SCL signal reception is temporally prioritized over SCL signal transmission. DDC analysis and forwarding unit 622 may transmit SCL signal 662 in substantially real time at an interval of a local clock.

In an aspect, when resolving any contention between SDA signal 666 (being transmitted to an HMDI source terminal) and SDA signal 664 (being received from the HMDI source terminal), DDC analysis and forwarding unit 622 may run a protocol analysis state machine that prioritizes a reception of SDA signal 664 over a transmission of SDA signal 666. In other words, for sink terminal 308, SDA signal reception is temporally prioritized over SDA signal transmission. DDC analysis and forwarding unit 622 may transmit SDA signal 666 in substantially real time at an interval of a local clock.

In an aspect, when resolving any contention between CEC signal 670 (being transmitted to a source terminal) and CEC signal 645 (being received from the HMDI source terminal), CEC protocol analysis unit 634 may run a protocol analysis state machine that prioritizes a reception of CEC signal 645 (received from config analysis unit 620 as a CEC signal 672) over a transmission of CEC signal 670. To accomplish this, CEC protocol analysis unit 634 may transmit and receive a CEC signal 654 from CEC arbitration unit 616. In an aspect, the protocol analysis state machine is implemented in CEC protocol analysis unit 634. The CEC protocol analysis state machine may perform CEC arbitration to resolve contention on the CEC bus. In other words, for sink terminal 308, CEC signal reception is temporally prioritized over CEC signal transmission. CEC protocol analysis unit 634 may transmit CEC signal 670 in substantially real time at an interval of a local clock.

In an aspect, time division multiplex unit 618 receives SCL and SDA signals to be transmitted from DDC analysis and forwarding unit 622, and a CEC signal to be transmitted from CEC protocol analysis unit 634. Time division multiplex unit 618 may be configured to cyclically collect and combine an SCL signal and an SDA signal (collectively depicted as a signal 650) to be transmitted from DDC analysis and forwarding unit 622, and a CEC signal 651 to be transmitted from CEC protocol analysis unit 634. Signal 650 is selected by multiplexer 636 under command from config analysis unit 626 and transmitted as signal 674, in accordance with the HDMI mode. Signals 674 and 651, along with HPD signal 540, may be combined into a single-channel signal using time-division multiplexing. In an aspect, the SCL, SDA, CEC, and HPD signals to be transmitted may be combined in any arbitrary temporal arrangement.

The time-division multiplexed signals generated by time division multiplex unit 618 may be output as signal 674 to signal coding 608. Signal coding 608 may be configured to perform Manchester encoding on the time-division multiplexed signals comprising signal 674. This enables synchronization between sink terminal 308 and source terminal 204. An output from signal coding 608 is transmitted to TX circuit 606. TX circuit 606 is a transmission (transmit) circuit that is configured to convert one or more electrical signals (containing the time-division multiplexed SCL, SDA, CEC, and HPD signals) into optical signals for transmission over optical fiber 222. To achieve this functionality, TX circuit 606 may include one or more VCSELs (e.g., VCSEL 308).

In one aspect, one or more HDMI signals are received by sink terminal 308 from a source terminal via optical fiber 220. The received signals may include SCL signal 642, SDA signal 644, and CEC signal 645. These signals may be received in a time-division multiplexed format, as an optical signal. RX circuit 604 may convert this optical signal into an electrical signal using one or more photodetectors (e.g., PD 304). The electrical signal may be received by channel decoding 610 that is configured to convert any received signals that are Manchester-encoded into non-Manchester-encoded signals.

In an aspect, an output of channel decoding 610 is received by time division demultiplex 612 that is configured to time-division demultiplex the received signals, into:

*SCL signal 642 that is transmitted to DDC analysis and forwarding unit 514;

*SDA signal 644 that is transmitted to DDC analysis and forwarding unit 514; and

*CEC signal 645 that is transmitted to config analysis unit 536.

In an aspect, once the SCL, and SDA signals (e.g., SCL signal 622 and SDA signal 624) have been received, DDC analysis and forwarding unit 622 outputs these signals to multiplexer 640. Multiplexer 640 is enabled in HDMI mode to forward SCL signal 622 and SDA signal 624 to AUX+ interface 624 and AUX− interface 626, as an SCL signal 660 and an SDA signal 664, respectively. SCL signal 660 and an SDA signal 664 may then be transferred to slave I2C/AUX 108.

In an aspect, once the CEC signal (e.g., CEC signal 645) have been received, config analysis unit 620 outputs this signal to CONFIG. 2 interface 630, as CEC signal 670. CEC signal 670 may then be transferred to slave I2C/AUX 108.

Subsequent to receiving SCL signal 660, SDA signal 664 and CEC signal 645, signal 674 that is comprised of an SCL signal, an SDA signal, a CEC signal and an HPD signal time-division multiplexed with each other by time division multiplex unit 618, may be transmitted to sink terminal 204. In this way, half-duplex communication of the sideband signals using one or more optical resources is accomplished.

As depicted in FIG. 4, CONFIG 1 signal 314 is not used as an HDMI control signal in HDMI mode; hence, CONFIG. 1 interface 628 is not used in HDMI mode, other than for determining whether to select the HDMI mode, or to select a DP mode. In general, AUX+ interface 624, AUX− interface 626, CONFIG. 1 interface 628, and CONFIG. 2 interface 630 are bidirectional, while HPD interface 632 is unidirectional, being a transmit-only interface.

Figure 7:
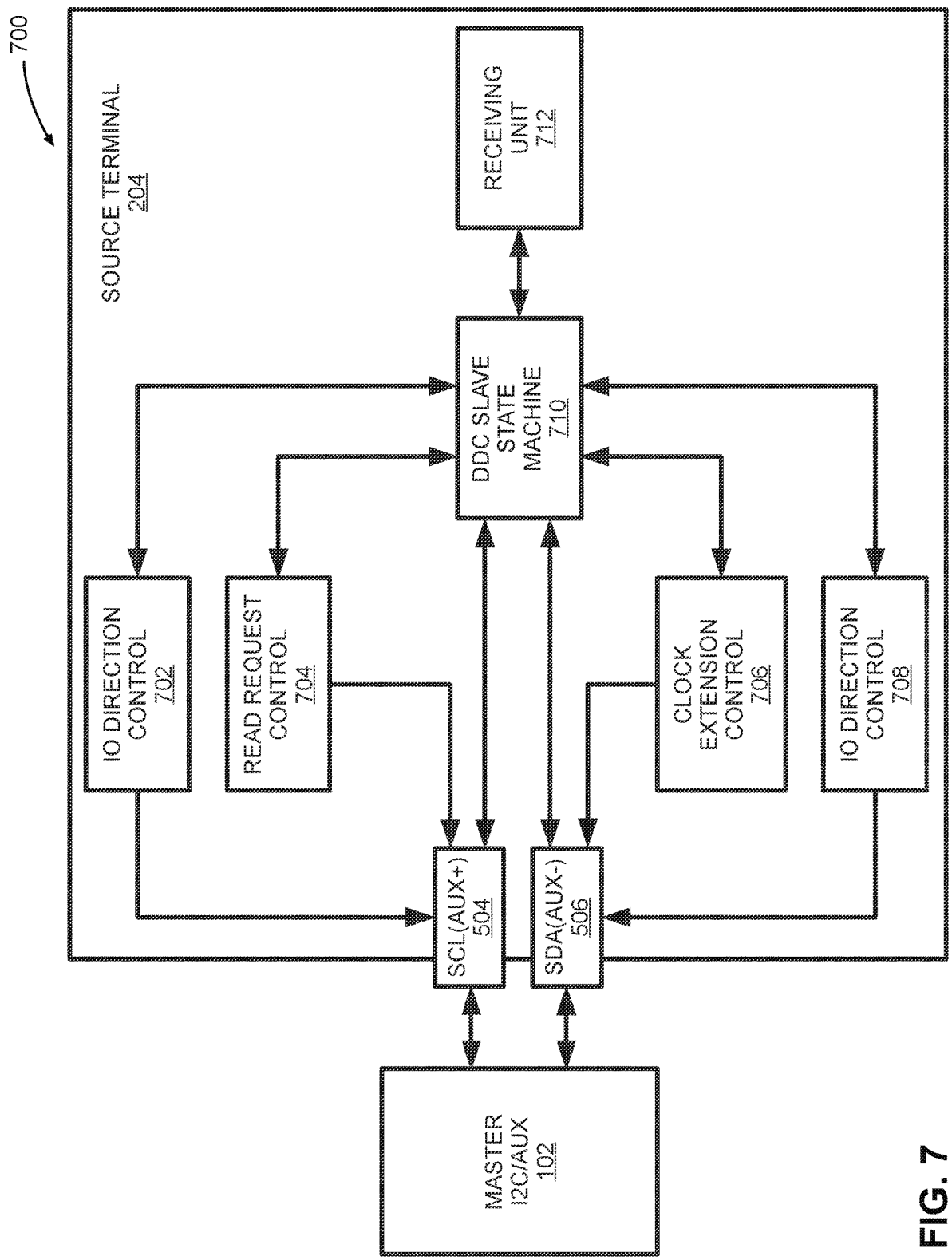
FIG. 7 is a block diagram depicting an interface between a source terminal and a master I2C/AUX.

FIG. 7 is a block diagram depicting an interface 700 between source terminal 204 and master I2C/AUX 102. Interface 700 depicts internal components of DDC analysis and forwarding unit 514. Interface 700 is applicable to an HDMI mode of operation. As depicted, source terminal 204 includes an IO direction control 702, a read request control 704, a clock extension control 706, an IO direction control 708, a DDC slave state machine 710, and a receiving unit 712. Also depicted are AUX+ 504 and AUX− 506 interfaces, used for SCL and SDA signals respectively.

In an aspect, DDC slave state machine 710 is configured to resolve a contention between SDA signal 564 and SDA signal 552, and between SCL signal 566 and SCL signal 554. In response to the contention resolution, IO direction control 702 and IO direction control 708 switch a direction of communication of AUX+ interface 504 and AUX− interface 506 respectively, to transition between receive and transmit modes. For example, IO direction control 602 may switch a direction of communication of AUX+ interface 504 from an input (i.e., receiving SCL signal 554 from master I2C/AUX 102) to an output (i.e., transmitting SCL signal 566 to master I2C/AUX 102) once SCL signal 554 has been transmitted to sink terminal 308. This enables SCL signal 566 to be transmitted to master I2C/AUX 102 and then to a DP or an HDMI source associated with master I2C/AUX 102. DDC slave state machine 710 may be configured as a finite state machine.

In an aspect, receiving unit 612 is configured to receive unpacked SCL signal 566 and unpacked SDA signal 564 (i.e., time-division demultiplexed SCL signal 566 and time-division demultiplexed SDA signal 564) from time division demultiplex unit 532.

In an aspect, DDC slave state machine 710 is configured to determine when to switch an IO direction for AUX+ interface 504 and/or AUX− interface 506, or when to pull down the IO for either or both of these interfaces. DDC slave state machine 710 may be configured to perform filtering and reshaping operations on the DDC signals (i.e., the SCL and the SDA signals). Read request control 704 and clock extension control 706 may be configured to respectively support Read Request and clock stretching functions as defined in the HDMI protocol. In an aspect, functions of read request control 704 and clock extension control 706 may be governed by DDC slave state machine 710.

Figure 8:
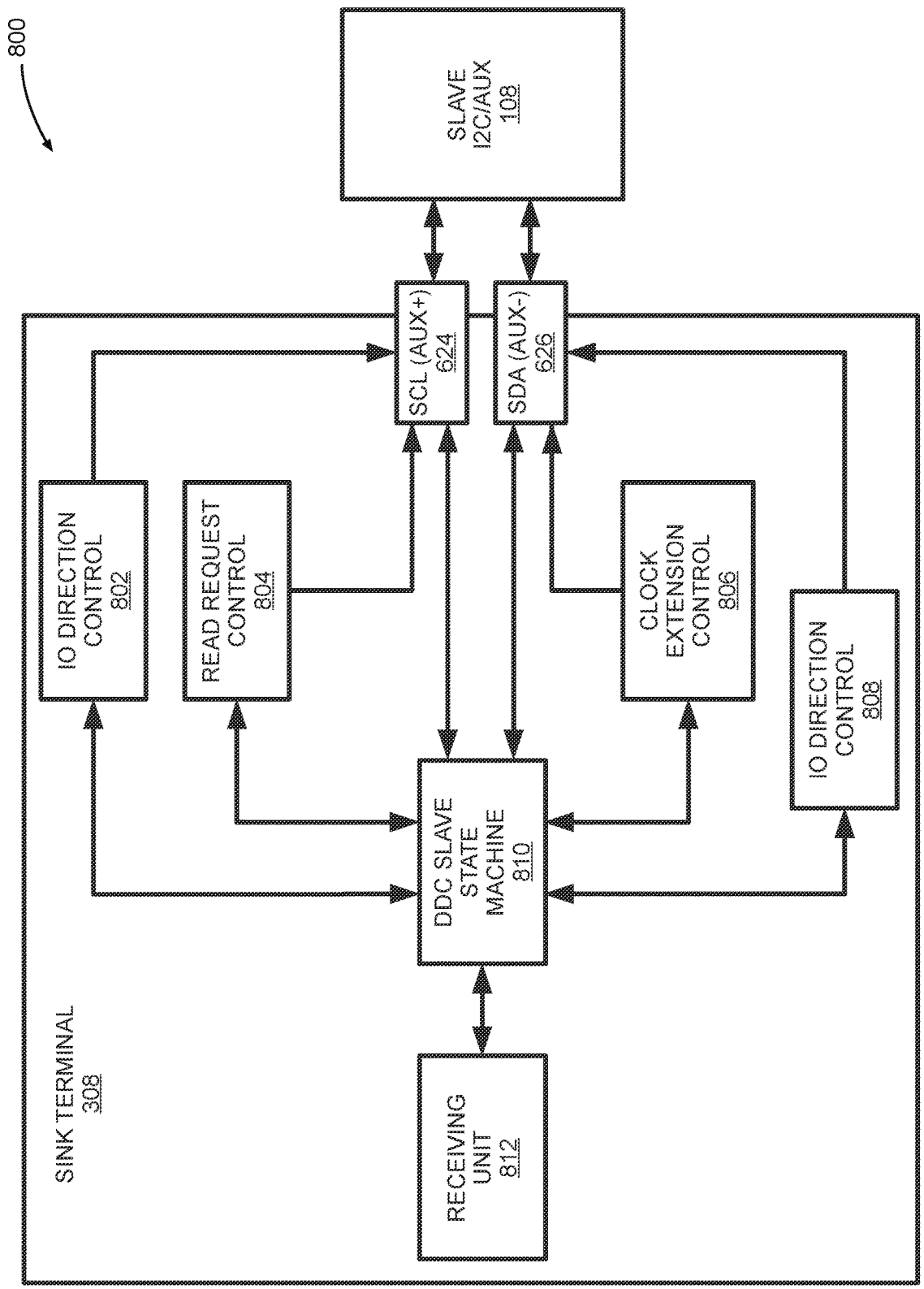
FIG. 8 is a block diagram depicting an interface between a sink terminal and a slave I2C/AUX.

FIG. 8 is a block diagram depicting an interface 800 between sink terminal 308 and slave I2C/AUX 108. Interface 800 depicts internal components of DDC analysis and forwarding unit 622. Interface 800 is applicable to an HDMI mode of operation. As depicted, sink terminal 308 includes an IO direction control 802, a read request control 804, a clock extension control 806, an IO direction control 808, a DDC slave state machine 810, and a receiving unit 812. Also depicted are AUX+ 624 and AUX− 626 interfaces, used for SCL and SDA signals respectively.

In an aspect, DDC slave state machine 810 is configured to resolve a contention between SCL signal 642 and SDA signal 662, and between SDA signal 644 and SDA signal 666. In response to the contention resolution, IO direction control 802 and IO direction control 808 switch a direction of communication of AUX+ interface 624 and AUX− interface 626 respectively, to transition between receive and transmit modes. For example, IO direction control 802 may switch a direction of communication of SCL interface 624 from an input (i.e., receiving SCL signal 662 from slave I2C/AUX 108) to an output (i.e., transmitting SCL signal 642 to slave I2C/AUX 108) prior to transmitting SCL signal 662 has been transmitted to source terminal 204. This enables SCL signal 642 to be transmitted to slave I2C/AUX 108 and then to an HDMI sink associated with slave I2C/AUX 108. DDC slave state machine 810 may be configured as a finite state machine.

In an aspect, receiving unit 812 is configured to receive unpacked SCL signal 642 and unpacked SDA signal 644 (i.e., time-division demultiplexed SCL signal 642 and time-division demultiplexed SDA signal 644) from time division demultiplex unit 612.

In an aspect, DDC slave state machine 810 is configured to determine when to switch an IO direction for AUX+ interface 624 and/or AUX− interface 626, or when to pull down the IO for either or both of these interfaces. DDC slave state machine 810 may be configured to perform filtering and reshaping operations on the DDC signals (i.e., the SCL and the SDA signals). Read request control 804 and clock extension control 806 may be configured to respectively support Read Request and clock stretching functions as defined in the HDMI protocol. In an aspect, functions of read request control 804 and clock extension control 806 may be governed by DDC slave state machine 810.

In an aspect, DDC analysis and forwarding unit 514 and DDC analysis and forwarding unit 622 support single read-write or continuous read-write operation for any I2C device address, support pulling down the associated SCL pin at the HDMI source to inform the HDMI source device of clock extension when source terminal 204 sends a clock extension signal. DDC analysis and forwarding unit 514 and DDC analysis and forwarding unit 622 may support pulling down the SDA pin of the source to inform the source device when sink terminal 308 sends a Read Request signal, and requesting to initiate DDC communication to an A8 address.

In an aspect, DDC analysis and forwarding unit 514 and DDC analysis and forwarding unit 622 each includes a DDC slave state machine (i.e., DDC slave state machines 710 and 810, respectively) operating in substantially real-time, configured to forward communication signals in substantially real-time according to the communication sent by a master I2C/AUX. These DDC slave state machines may each update a communication state at substantially the same time. Each state machine can analyze whether master I2C/AUX 102 is waiting for an ACK signal (return signal) from slave I2C/AUX 108, or waiting for reading data in real time, thus switching IO communication direction and forwarding signals received from slave I2C/AUX 108 to master I2C/AUX 102 in time to realize substantially real-time I2C communication forwarding.

In an aspect, each of DDC analysis and forwarding unit 514 and DDC analysis and forwarding unit 622 can analyze one or more instructions of clock extension and Read Request according to the signals sent from I2C (i.e., master I2C/AUX 102 and slave I2C/AUX 108, respectively), and control associated SCL and SDA pins (i.e., AUX+ and AUX− interfaces, respectively) to forward these two requests.

In an aspect, the DDC slave state machine 710 functions as a DDC slave, in a sense that DDC slave state machine 710 when master I2C/AUX 102 is writing or reading, or needs acknowledgment. This information is transformed to IO direction decisions by DDC slave state machine 710. For example, during writing, the IO direction is from the master I2C/AUX 102 to slave I2C/AUX 108, while during reading and acknowledgment, the IO direction is from slave I2C/AUX 108 to the master I2C/AUX 102. Similarly, DDC slave 810 state machine uses DDC signals transmitted from source terminal 204 to judge if master I2C/AUX 102 is writing or reading, or needs acknowledgment, and changes the IO direction accordingly. AUX slave state machine 916 may be configured as a finite state machine.

For read request control, the read request is launched by sink terminal 308, to inform source terminal 204 to read the status information from slave I2C/AUX 108. In this case, read request control 804 on sink terminal 308 will check if slave I2C/AUX 108 is pulling down the SDA signal for a long enough time to start a read request. This read request information is packed and transmitted through bidirectional optical communication channel 528 to the source DP terminal 204. On receiving the read request information, read request control 704 on source terminal 204 will pull down the SDA signal for enough to inform master I2C/AUX 102 accordingly.

Figure 9:
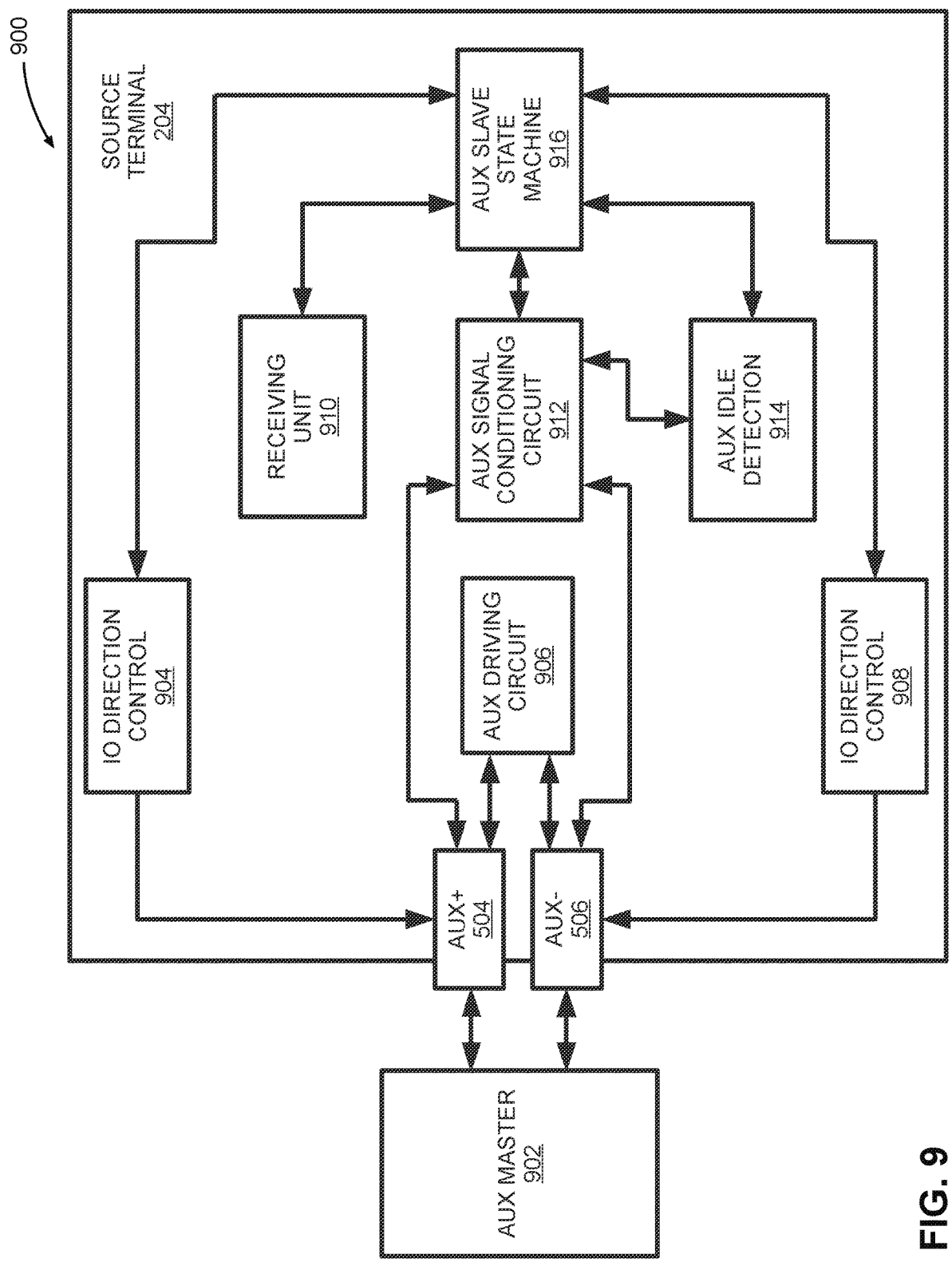
FIG. 9 is a block diagram depicting an interface between a source terminal and an aux master.

FIG. 9 is a block diagram depicting an interface 900 between source terminal 204 and an AUX master 902. Interface 900 depicts internal components of AUX analysis and forwarding unit 515. Interface 900 is applicable to a DP mode of operation. As depicted, source terminal 204 includes an IO direction control 904, an AUX driving circuit 906, an IO direction control 908, a receiving unit 910, an AUX signal conditioning circuit 912, an AUX idle detection 914, and an AUX slave state machine 916. Also depicted are AUX+ 504 and AUX− 506 interfaces. AUX master 902 may be identical to master I2C/AUX 102.

In an aspect, AUX slave state machine 916 is configured to resolve a contention between AUX+ signal 548 and AUX+ signal 566, and between AUX− signal 546 and AUX− signal 564. In response to the contention resolution, IO direction control 904 and IO direction control 908 may switch a direction of communication of AUX+ interface 504 and AUX− interface 506 respectively, to transition between receive and transmit modes. For example, IO direction control 904 may switch a direction of communication of AUX+ interface 504 from an input (i.e., receiving AUX+ signal 548 from AUX master 902/master I2C/AUX 102) to an output (i.e., transmitting AUX+ signal 566 to AUX master 902/master I2C/AUX 102) once AUX+ signal 548 has been transmitted to sink terminal 308. This enables AUX− signal 566 to be transmitted to master I2C/AUX 102 and then to a DP source associated with master AUX master 902/master I2C/AUX 102.

In an aspect, receiving unit 910 is configured to receive unpacked AUX+ signal 566 and unpacked AUX− signal 564 (i.e., time-division demultiplexed AUX+ signal 566 and time-division demultiplexed AUX− signal 564) from time division demultiplex unit 532.

In an aspect, AUX slave state machine 916 is configured to determine when to switch an IO direction for AUX+ interface 504 and/or AUX− interface 506, or when to pull down the IO for either or both of these interfaces. AUX slave state machine 916 may be configured to perform filtering and reshaping operations on the AUX signals (i.e., the AUX+ and the AUX− signals).

In an aspect, AUX idle detection 914 is configured to detect an idle condition associated with AUX/− signal transmission or reception. AUX signal conditioning circuit 912 may be implemented as an analog amplifier and an analog-to-digital converter that converts the analog AUX+/− signals from analog signals to digital signals. AUX driving circuit 906 may be configured as a signal driving circuit to drive AUX+ interface 504 and AUX− interface 506 in accordance with the DP protocol. In an aspect, AUX driving circuit 906 may drive a 50 Ohm resistor for each of the AUX+ and AUX− signal lines, to obtain a specified signal swing to conform to the DP specification. In an aspect, AUX driving circuit 906 may include one or more low-voltage differential signaling (LVDS) drivers to ensure that the associated AUX signals are driven with sufficient power.

Figure 10:
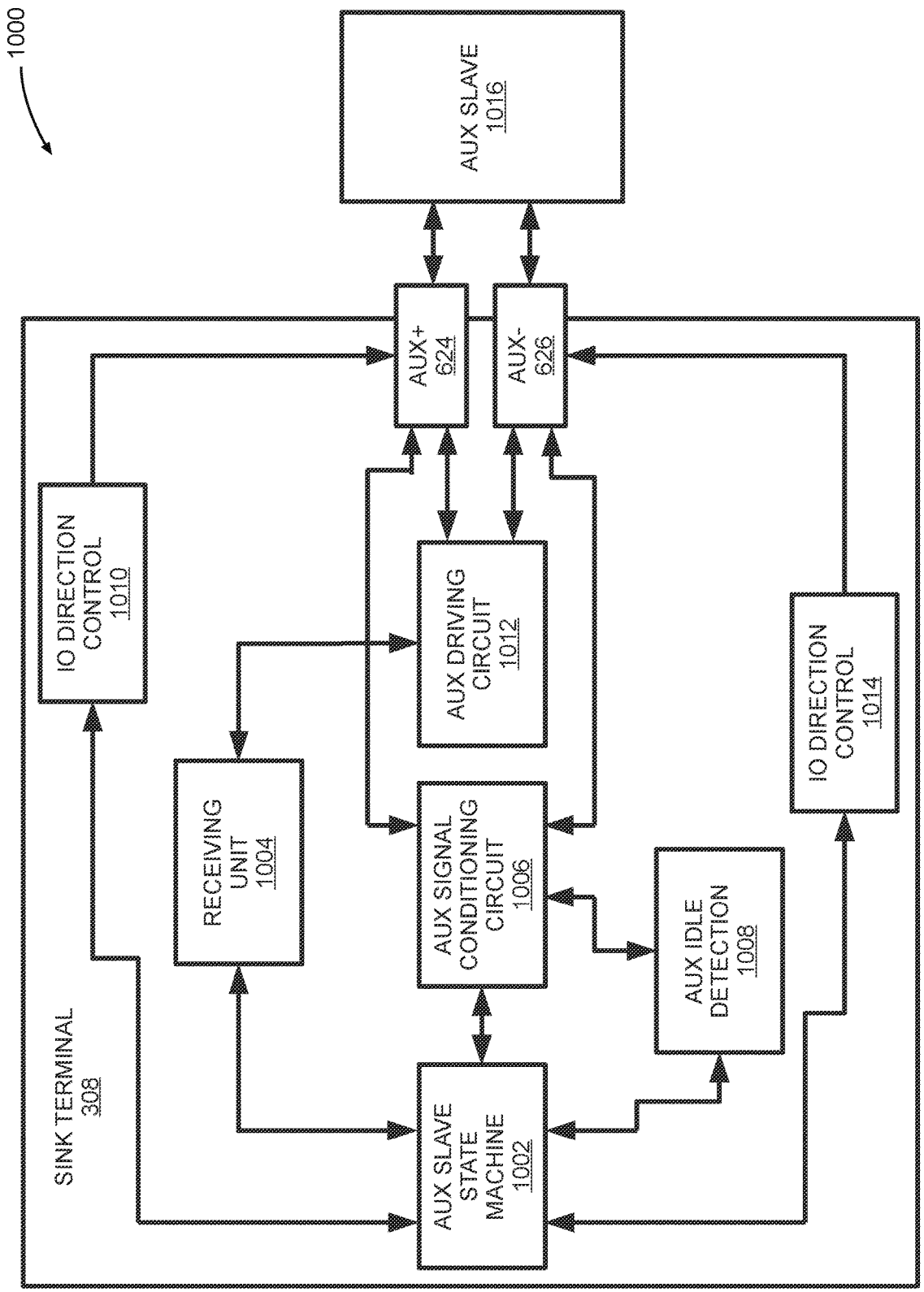
FIG. 10 is a block diagram depicting an interface between a sink terminal and an aux slave.

FIG. 10 is a block diagram depicting an interface 1000 between sink terminal 308 and an aux slave 1016. Interface 1000 depicts internal components of AUX analysis and forwarding unit 614. Interface 1000 is applicable to a DP mode of operation. As depicted, sink terminal 308 includes an IO direction control 1010, an AUX driving circuit 1012, an IO direction control 1014, a receiving unit 1004, an AUX signal conditioning circuit 1006, an AUX idle detection 1008, and an AUX slave state machine 1002. Also depicted are AUX+ 624 and AUX− 626 interfaces. AUX slave 1016 may be identical to slave I2C/AUX 108.

In an aspect, AUX slave state machine 1002 is configured to resolve a contention between AUX+ signal 642 and AUX+ signal 656, and between AUX− signal 644 and AUX− signal 658. In response to the contention resolution, TO direction control 1010 and TO direction control 1014 may switch a direction of communication of AUX+ interface 624 and AUX− interface 626 respectively, to transition between receive and transmit modes. For example, TO direction control 1010 may switch a direction of communication of AUX+ interface 624 from an output (i.e., transmitting AUX+ signal 642 to AUX slave 1016/slave I2C/AUX 108) to an input (i.e., receiving AUX+ signal 656 from AUX slave 1016/slave I2C/AUX 108) once AUX+ signal 642 has been transmitted to slave I2C/AUX 108. This enables AUX− signal 656 to be transmitted to source terminal 204. AUX+ signal 642 may be further transmitted from AUX slave 1016/slave I2C/AUX 108 to a DP source associated with AUX slave 1016/slave I2C/AUX 108. AUX slave state machine 916 may be configured as a finite state machine.

In an aspect, receiving unit 1004 is configured to receive unpacked AUX+ signal 642 and unpacked AUX− signal 644 (i.e., time-division demultiplexed AUX+ signal 642 and time-division demultiplexed AUX− signal 644) from time division demultiplex unit 612.

In an aspect, AUX slave state machine 1002 is configured to determine when to switch an TO direction for AUX+ interface 624 and/or AUX− interface 626, or when to pull down the TO for either or both of these interfaces. AUX slave state machine 1002 may be configured to perform filtering and reshaping operations on the AUX signals (i.e., the AUX+ and the AUX− signals).

In an aspect, AUX idle detection 1008 is configured to detect an idle condition associated with AUX/− signal transmission or reception. AUX signal conditioning circuit 1006 may be implemented as an analog amplifier and an analog-to-digital converter that converts the analog AUX+/− signals from analog signals to digital signals. AUX driving circuit 1012 may be configured as a signal driving circuit to drive AUX+ interface 624 and AUX− interface 626 in accordance with the DP protocol. In an aspect, AUX driving circuit 1012 may drive a 50 Ohm resistor for each of the AUX+ and AUX− signal lines, to obtain a specified signal swing to conform to the DP specification. In an aspect, AUX driving circuit 1012 may include one or more low-voltage differential signaling (LVDS) drivers to ensure that the associated AUX signals are driven with sufficient power.

To support a dual-mode DP (DP++)/HDMI functionality, optical communication system 100 implements an architecture that will adaptively select an appropriate sideband communication protocol between an HDMI Sideband communication and DP communication according to different CONFIG terminations on the two terminals. In one aspect, DP sideband signals including AUX+, AUX−, CONFIG. 1 and CONFIG. 2 are analyzed at the source side, and time-multiplexed and encoded to be transmitted to DP receiver through the optical communication resources.

On the DP receiver/sink side, five signals—AUX+, AUX−, CONFIG. 1, CONFIG. 2 and HPD—are analyzed and time-multiplexed and encoded to be transmitted to DP transmitter/source side through a fiber. Each of config analysis unit 536 and 620 processes the source and sink CONFIG termination information to produce a protocol selecting signals 586, 587, 652, and 653. These signals are used to appropriately configure the corresponding multiplexer (e.g., multiplexer 542).

In DP sideband mode, AUX+ AUX− will transmit aux signals between a DP transmitter/source and a DP receiver/sink. An HPD signal (e.g., HPD signal 540) is transmitted from the DP receiver/sink to the DP transmitter/source. In HDMI sideband mode, AUX+, AUX− IO interfaces are configured to transmit HDMI DDC signals. In this case, the AUX+, AUX− is routed to a DDC analyzer (e.g., DDC analysis and forwarding unit 514) to support DDC communication. The CONFIG. 2 signal (e.g., CONFIG. 2 signal 562) in this mode acts as a CEC pin and is routed to a CEC Analyzer (e.g., CEC protocol analysis unit 516 and CEC arbitration 534).

In an aspect, in a DP mode, an active (hardware) cable can be built according to source optical interface 200 and sink optical interface 300. In an HDMI mode, an active (hardware) cable can be built according to source optical interface 200, sink optical interface 300 and DP/HDMI sink optical interface 400. In one aspect, A DP fiber active cable is formed by connecting source interface 202 and sink interface 302 with a lens and a multimode fiber, which enables the cable to realize high-speed audio and video data transmission between DP 1.2 and DP 1.4 protocol devices at a relatively low cost.

Figure 11:
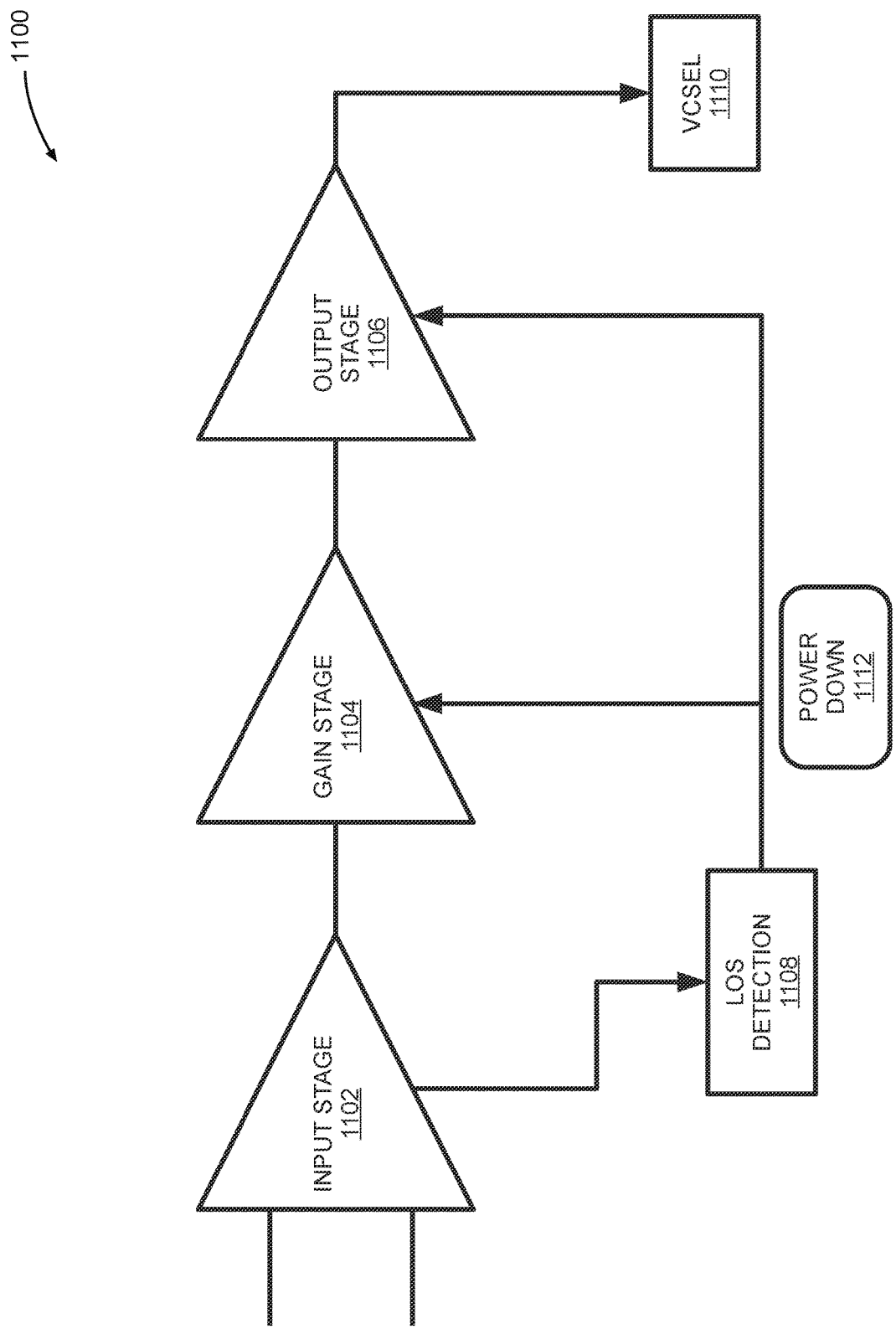
FIG. 11 is a circuit diagram depicting a loss-of-signal (LOS) detection circuit for DP signal transmission.

FIG. 11 is a circuit diagram depicting a loss-of-signal (LOS) detection circuit 1100 for DP signal transmission. As depicted, LOS detection circuit 1100 may include an input stage 1102, a gain stage 1104, an output stage 1106, a LOS detection 1108, and a VCSEL 1110. Each of input stage 1102, gain stage 1104, and output stage 1106 may be implemented using one or more operational amplifiers (op-amps). One or more embodiments of LOS detection circuit 1100 may be included in source interface 202 as an adaptive low-power design for DP signal transmission. In an aspect, each transmitted DP signal associated with source interface 202 may be associated with a distinct LOS detection circuit similar to LOS detection circuit 1100.

In an aspect, input stage 1102 is configured as a preamplifier to provide, for example, impedance matching between a DP signal source and gain stage 1104. Gain stage 1104 may be configured to increase signal voltage or power gain for the DP signal. Output stage 1106 may be configured to drive VCSEL 1110. In an aspect, VCSEL 1110 may be any of the VCSELs associated with source interface 202. Gain stage 1104 and output stage 1106 may be a part of a main link DP transmitter signal chain associated with source interface 202.

In an aspect, LOS detection 1108 is configured to compare an input signal swing associated with a DP signal (received from, for example, master I2C/AUX 102), to a programmable threshold associated with the input signal (e.g., voltage) swing. When the input signal swing is smaller than the threshold, a power down signal 1112 (also referred to as a "LOS signal") is generated by LOS detection 1108 to signify the lack of input signal. When power down signal 1112 is asserted, gain stage 1104 and output stage 1106 may be powered down to save power.

Figure 12:
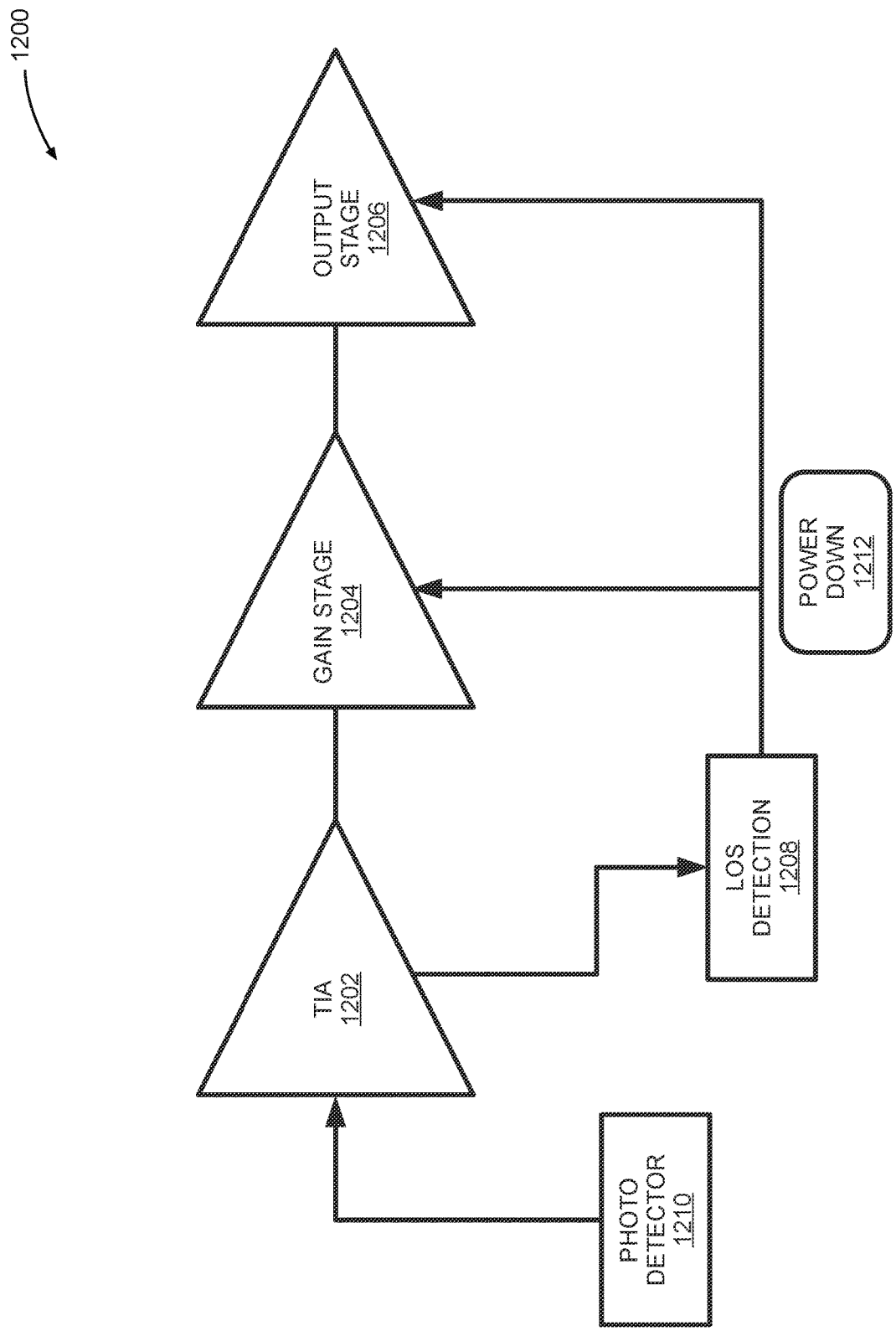
FIG. 12 is a circuit diagram depicting a loss-of-signal (LOS) detection circuit for DP signal reception.

FIG. 12 is a circuit diagram depicting a loss-of-signal (LOS) detection circuit 1200 for DP signal reception. As depicted, LOS detection circuit 1100 may include trans impedance amplifier (TIA) 1202, a gain stage 1204, an output stage 1206, a LOS detection 1208, and a photodetector 1110. Each of TIA 1202, gain stage 1204, and output stage 1206 may be implemented using one or more operational amplifiers (op-amps). One or more embodiments of LOS detection circuit 1200 may be included in sink interface 302 as an adaptive low-power design for DP signal reception. In an aspect, each received DP signal associated with sink interface 302 may be associated with a distinct LOS detection circuit similar to LOS detection circuit 1200.

In an aspect, input stage 1202 is configured as a preamplifier to provide, for example, impedance matching between photodetector 1210 and gain stage 1204. In an aspect, photodetector 1210 may be any of the photodetectors associated with sink interface 302. Gain stage 1204 may be configured to increase signal voltage or power gain for the received DP signal. Output stage 1206 may be configured to produce an output signal sufficiently strong to drive different components associated with sink interface 302. Gain stage 1204 and output stage 1206 may be a part of a main link DP receiver signal chain associated with sink interface 302.

In an aspect, LOS detection 1208 is configured to compare an input signal swing associated with a DP signal received from photodetector 1210, to a programmable threshold associated with the input signal (e.g., voltage) swing. When the input signal swing is smaller than the threshold, a power down signal 1212 (also referred to as a "LOS signal") is generated by LOS detection 1208 to signify the lack of input signal. When power down signal 1212 is asserted, gain stage 1204 and output stage 1206 may be powered down to save power.

In a DP link Training Process, different lanes configuration can be used by different applications. Different applications can use 1 lane, 2 lanes, or 4 lanes to transmit high speed video and audio signals. In an aspect, LOS detection circuits 1100 and 1200 enable power savings in 1 lane and 2 lane configurations.

Figure 13:
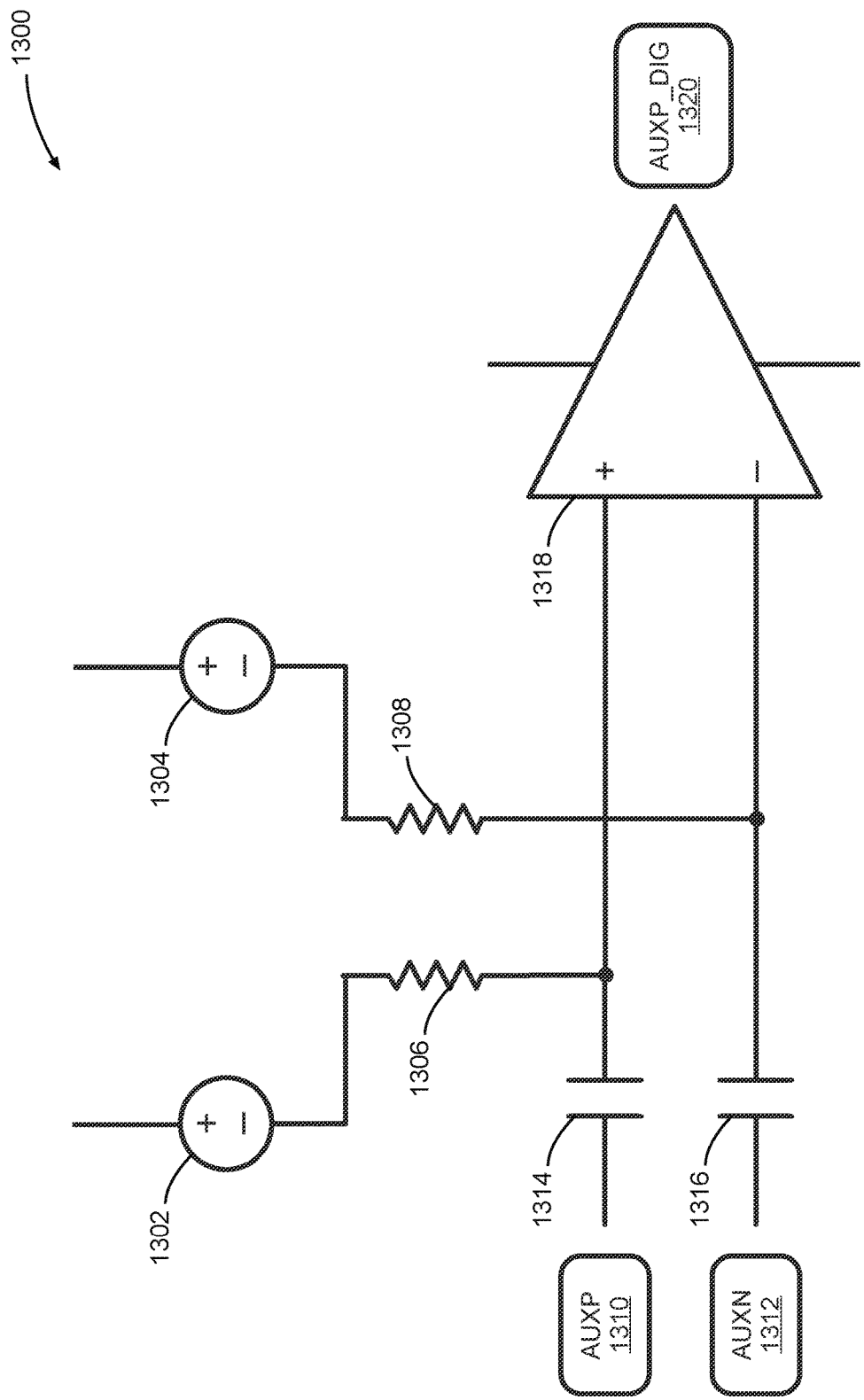
FIG. 13 is a circuit diagram depicting an analog-to-digital converter for a DP signal.

FIG. 13 is a circuit diagram depicting an analog-to-digital converter 1300 for a DP signal. As depicted, analog-to-digital converter (ADC) 1300 includes a voltage source 1302, a voltage source 1304, a resistor 1306, a resistor 1308, a capacitor 1314, a capacitor 1316, and an operational amplifier (op-amp) 1318. ADC 1300 may be used to convert a differential pair of AUX analog signals (i.e., an AUXP signal 1310 and an AUXN signal 1312) into an AUXP_DIG digital signal 1320. Voltage source 1302 may be connected to a positive input terminal of op-amp 1318 via resistor 1306. Voltage source 1304 may be connected to a negative input terminal of op-amp 1318 via resistor 1308. AUXP signal 1310 may be capacitively coupled to the positive input terminal of op-amp 1318 via capacitor 1314. AUXN signal 1312 may be capacitively coupled to the negative input terminal of op-amp 1318 via capacitor 1316.

In an aspect, each of voltage source 1302 and 1304 outputs a voltage DC1 and DC2 respectively, where DC1 and/or DC2 may be programmable values. In one aspect, DC1>DC2, and op-amp 1318, configured as a comparator, outputs DC1-DC2.

In an aspect, AUXP signal 1310 is identical to an AUX+ signal (e.g., AUX+ 206), and AUXN signal 1312 is identical to an AUX− signal (e.g., AUX− 208). DC1-DC2 may be programmed to be smaller than differential swing of AUXP signal 1310 and AUXN signal 1312.

Figure 14:
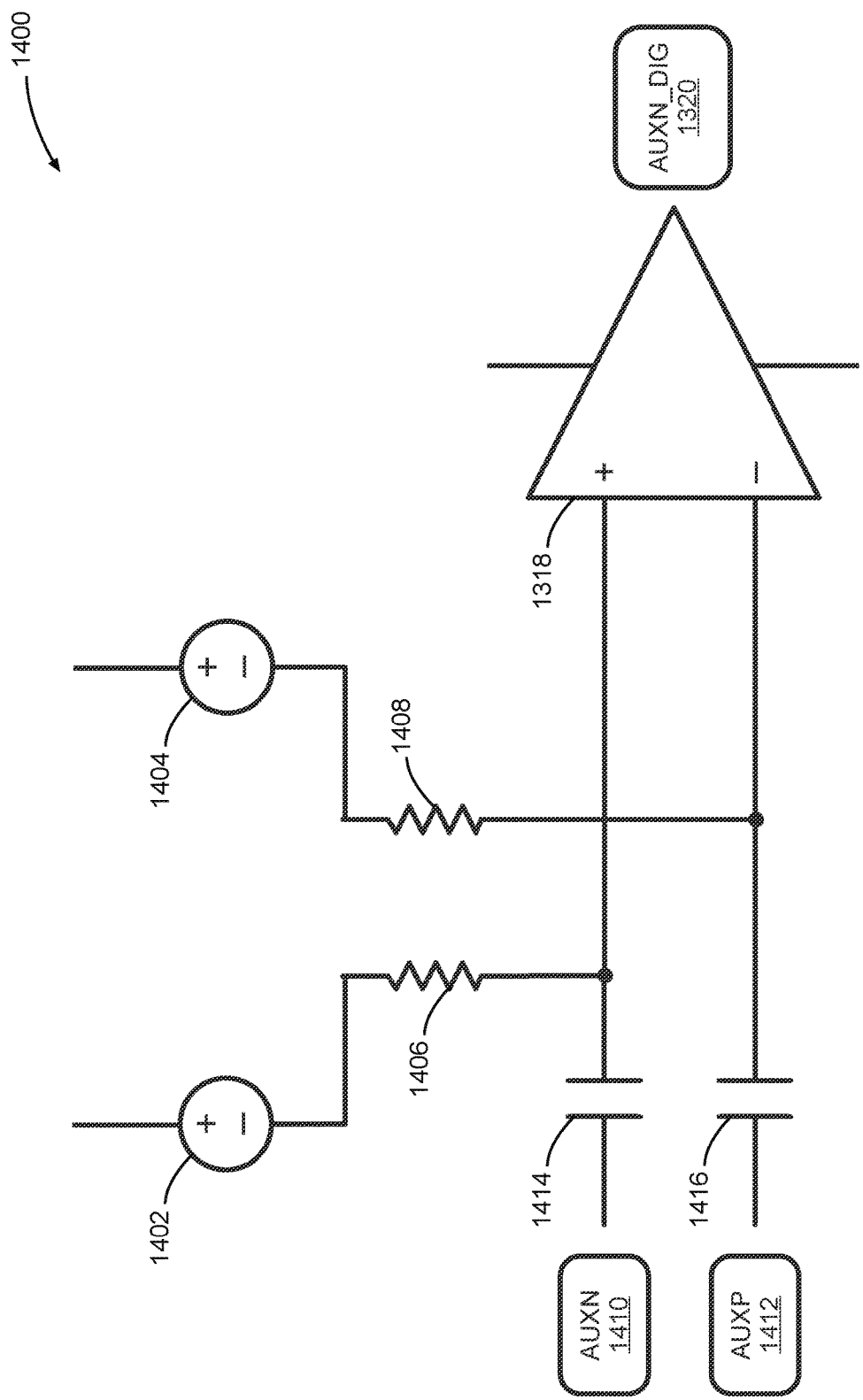
FIG. 14 is a circuit diagram depicting an analog-to-digital converter for a DP signal.

FIG. 14 is a circuit diagram depicting an analog-to-digital converter 1400 for a DP signal. As depicted, analog-to-digital converter (ADC) 1400 includes a voltage source 1402, a voltage source 1404, a resistor 1406, a resistor 1408, a capacitor 1414, a capacitor 1416, and an operational amplifier (op-amp) 1418. ADC 1400 may be used to convert a differential pair of AUX analog signals (i.e., an AUXN signal 1410 and an AUXP signal 1412) into an AUXN_DIG digital signal 1420. Voltage source 1402 may be connected to a positive input terminal of op-amp 1418 via resistor 1406. Voltage source 1404 may be connected to a negative input terminal of op-amp 1418 via resistor 1308. AUXN signal 1410 may be capacitively coupled to the positive input terminal of op-amp 1418 via capacitor 1414. AUXP signal 1412 may be capacitively coupled to the negative input terminal of op-amp 1418 via capacitor 1416.

In an aspect, each of voltage source 1402 and 1404 outputs a voltage DC1 and DC2 respectively, where DC1 and/or DC2 may be programmable values. In one aspect, DC1>DC2, and op-amp 1418, configured as a comparator, outputs DC1-DC2.

In an aspect, AUXN signal 1410 is identical to an AUX− signal (e.g., AUX− 208), and AUXP signal 1412 is identical to an AUX+ signal (e.g., AUX+ 206). DC1-DC2 may be programmed to be smaller than differential swing of AUXN signal 1410 and AUXP signal 1412.

Each of analog-to-digital converter 1300 and 1400 may function to provide three output signal states associated with an AUX bus (comprising an AUX+ signal and an AUX− signal): a logic high state, a logic low state, and an idle state. In an aspect, each of op-amp 1318 and 1418 functions as a comparator, generating differential signals AUXP_DIG 1320 and AUXN_DIG 1420. If AUXP_DIG 1320 is high, then AUXN_DIG 1420 is low. If AUXP_DIG 1320 is low, then AUXN_DIG 1420 is high. In a logic idle state, both AUXP_DIG 1320 and AUXN_DIG 1420 are high. In an aspect, each of AUX slave state machine 916 and AUX slave state machine 1002 use AUXP_DIG 1320 and AUXN_DIG 1420 signals to perform AUX analysis on the corresponding AUX+ and AUX− signals. In an aspect, analog-to-digital converters 1300 and 1400 may be used to implement each of AUX driving circuit 906 and AUX driving circuit 1006.

In one aspect, each of AUX slave state machine 916 and AUX slave state machine 1002 is configured to predict a current direction of AUX transmission associated with source terminal 204 and sink terminal, respectively. This enables substantially maximizing a half-duplex AUX communication via the full-duplex optical communication resources. In one aspect, AUX transactions work in the request and response style. First an AUX master (e.g., AUX master 902) sends a request, after which an associated AUX slave (e.g., AUX slave 1016) sends a response packet before the waiting timeout of the AUX.

In an aspect, on both the DP source and DP sink side, each pair of DP AUX+ and AUX− analog signals (e.g., AUXP 1310 and AUXN 1312) are transformed to digital signals (e.g., AUXP_DIG 1320 and AUXN_DIG 1420) by analog-to-digital converters 1300 and 1400.

In one aspect, on source terminal 204, each digitized AUX signal analyzed by AUX slave state machine 916 to deduce an IO direction of the AUX signals. AUX slave state machine 916 may run like a normal AUX slave, but only extracts the IO direction related information from an AUX transaction.

On power up, AUX slave state machine 916 may enter a wait state and wait for an AUX transaction (or an AUX request) from the master side (e.g., from AUX master 902). After the AUX request has been fully received from the AUX master, the AUX slave state machine 916 may switch the IO direction of aux signals to wait for an associated AUX slave (e.g., AUX slave 1016) to respond to that request. Some aspects may include implementing a timeout check when AUX slave state machine 916 is waiting for an AUX slave response. If the wait timeout is asserted, AUX slave state machine 916 may return to its initial state to wait for an AUX request from the master side.

In an aspect, AUX slave state machine 1002 analyzes an AUX transaction on the slave side to change the IO direction of one or more AUX signals. On power up, In an aspect, AUX slave state machine 1002 may enter a wait state and wait for an AUX transaction from the master side, and transmit the received AUX request to AUX driver 1012 to transform the digital signal to analog domain. After that In an aspect, AUX slave state machine 1002 may switch the IO direction of AUX+ and AUX− and wait for an AUX slave (e.g., AUX slave 1016) to respond to the request.

Optical communication system 100 may be implemented as an integrated circuit structure to support feasible, cost effective fiber transmission of DisplayPort Main-Link (ML0, ML1, ML2, ML3) signals and sideband signals (AUX+, AUX−, HPD). Optical communication system 100 may be used to implement a DP-AoC (Active Optical Cable). In one aspect, source interface 202 may be integrated on a first integrated circuit that may be packaged on a first printed circuit board. Sink interface 302 may be integrated on a second integrated circuit that may be packaged on a second printed circuit board. This highly integrated architecture enables a construction of DP or even mini-DP cables with relatively small form factors compared to other contemporary implementations that use discrete units like optical modules, MCUs, FPGAs, SerDes.

In one aspect, an AUX signal associated with a DP mode of transmission may adopt Manchester coding and may be communicated at a speed of about 1 MHz. Considering the bandwidth overhead of coding and time division multiplexing, the master clock frequency of the whole system may be set to be greater than 100 Mhz.

In an aspect, one or more DDC, AUX, and/or CEC analysis units (e.g., AUX analysis and forwarding unit 615) may not analyze signals in a store-and-forward manner, rather implementing a wire-speed forwarding mode as described herein. This can reduce the communication delay to within 50 ns and greatly enhance the compatibility of the final display transmission scheme with different devices.

In an aspect, if the CONFIG analysis result from config analysis unit 536 shows that HDMI and/or /DVI communication is performed, DDC decoding and forwarding unit 514 analyzes associated SDA and SCL signals of the source in substantially real time, and feeds back ACK (Acknowledge character) and read data of the display device to the source in substantially real time. DDC decoding and forwarding unit 514 may support single read/write or continuous read/write operation for any I2C device address, supports pulling down the SCL pin at the source to inform the source device of clock extension when the clock extension signal is sent from the DP receiver module, supports pulling down the SDA pin of the source to inform the source when a Read Request signal is sent from the DP receiver module, and requests to initiate DDC communication to an A8 address.

In an aspect, each DDC analysis and forwarding unit (i.e., DDC analysis and forwarding units 514 and 622) uses a DDC slave state machine (i.e., DDC slave state machines 710 and 810, respectively) running in substantially real time to forward the communication signals in substantially real time according to the communication sent by master I2C/AUX 102 (two-wire serial bus) and update the communication state at the same time. A DDC Slave state machine (a slave of the DDC protocol) can analyze whether the master I2C/AUX is waiting for the ACK signal from slave I2C/AUX 108 or waiting for reading data in real time, and can switch the IO communication direction and forward the signals received from slave I2C/AUX 108 to master I2C/AUX 102 in substantially real time, thus realizing substantially real-time I2C communication forwarding. For example, the DDC Slave state machine 710 analyzes master I2C/AUX 102 in real time, while the master I2C/AUX 102 is waiting for ACK signals from the slave I2C/AUX 108 or waiting for reading data, so the IO communication direction is switched and the signals received by the salve I2C are forwarded to the master I2C/AUX in substantially real time, thus realizing substantially real-time I2C communication forwarding.

A DDC decoding and forwarding unit can also analyze the instructions of clock extension and Read Request according to the signals sent from the slave I2C/AUX 108, and control SDA and SCL pins to forward these two requests.

When source interface 202 is in HDMI and DVI communication mode, CEC protocol analysis unit 516 analyzes the CEC signals of the source and forwards them to the display device (sink). In an aspect, each of source interface 202 and sink interface 302 has a local CEC arbitration unit (i.e., CEC protocol analysis unit 516 and CEC protocol analysis unit 634, respectively), and each node conducts local arbitration. If the arbitration fails, the original communication direction will be switched, so the CEC communication that fails in arbitration will no longer be transmitted; otherwise, it will continue to be transmitted by flooding broadcast.

If the CONFIG analysis result on sink interface 302 shows that HDMI and DVI communication is carried out, DDC analysis and forwarding unit 622 analyzes SDA and SCL signals of the display device in substantially real time, and feeds back ACK and read data of the source to the display device in time. DDC analysis and forwarding unit 622 may support single read/write or continuous read/write operation for any I2C device address, and support pulling down the SCL pin at the display device to inform the display device of clock extension when the clock extension signal is sent from the source interface 202, supports pulling down the SDA pin at the display device to inform the display device when the source interface 202 sends a read Request signal, and requests to initiate DDC communication to an A8 address.

Each DDC analysis and forwarding unit (i.e., DDC analysis and forwarding unit 514 and 622) uses a DDC Slave state machine running in real time (i.e., DDC slave state machines 710 and 810, respectively) to forward associated communication signals in real time and update a communication state at the same time according to communication sent by master I2C/AUX 102. Each DDC Slave state machine analyzes substantially in real time whether slave I2C/AUX 108 is waiting for the ACK signal of master I2C/AUX 102 or waiting for reading data. Based on this, the DDC slave state machine can switch the IO communication direction and forward the signals received by master I2C/AUX 102 to slave I2C/AUX 108 in substantially real time, thus realizing substantially real-time I2C communication forwarding. For example, the DDC Slave state machine 801 analyzes slave I2C/AUX 108 in real time. If slave I2C/AUX 108 is waiting for the ACK signal of master I2C/AUX 102 or waiting for reading data, it switches the IO communication direction and forwards the signals received by master I2C/AUX 102 to slave I2C/AUX 108 in substantially real time, thus realizing real-time I2C communication forwarding.

In an aspect, each DDC analysis and forwarding unit can also analyze the instructions of clock extension and Read Request according to the signals sent from the master I2C/AUX 102, and control the SDA and SCL pins to forward these two requests.

When sink interface 302 is in HDMI/DVI communication mode, CEC protocol analysis unit 634 analyzes the CEC signals of the display device and forwards them to the source. In an aspect, each of source interface 202 and sink interface 302 has a local CEC arbitration unit (i.e., CEC protocol analysis unit 516 and CEC protocol analysis unit 634, respectively), and each node conducts local arbitration. If the arbitration fails, the original communication direction will be switched, so the CEC communication that fails in arbitration will no longer be transmitted; otherwise, it will continue to be transmitted by flooding broadcast.

In an aspect, each AUX (i.e., AUX+ and AUX−) signal is analyzed by signal amplification and signal validity detection at each of source interface 202 and sink interface 302, and the analysis result is an AUX valid signal if validity checks after differential subtraction and amplification of AUX are passed. When the AUX valid signal is 0, it means that the input signal is in idle state and there is no AUX communication. When the AUX valid signal is 1, it means that AUX communication is in progress. An AUX analysis and forwarding unit (e.g., AUX analysis and forwarding unit 515) may obtain a transmission state of the AUX signal by analyzing local AUX and AUX valid as well as AUX and AUX valid signals transmitted from the opposite end (the source or display device), thus determining the communication direction of the AUX.

In aspect, a power supply for the source interface 202 can be provided by the source or an external input power. A power supply for the sink interface 302 can be provided by the display device or an external input power supply. In an aspect, optical communication system 100 includes support for HPD signals, and can correctly reflect the plugging and unplugging state of cables in both cases of supplying power by a module outside the DP receiver and supplying power by the display device.

In one aspect, a wire-speed forwarding mode of optical communication system 100 is not limited to a specific I2C address, so it can be applied to reading of EDID signals, communication of HDCP and communication of SCDC. Even 128 I2C addresses from 0x 00 to 0x7F can be compatible.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. An optical transmitter comprising:
   an electrical interface configured to connect with a master signal source, wherein one or more electrical signals are communicated between the optical transmitter and the master signal source via the electrical interface;
   a configuration analysis unit configured to:
      analyze a first configuration signal received from the master signal source and a second configuration signal received from an optical receiver to determine whether an associated communication protocol is a DisplayPort (DP) communication protocol or an High-Definition Multimedia Interface (HDMI) communication protocol; and
      select a communication protocol from among a DP communication mode and an HDMI communication mode based on the analysis; and
   an auxiliary signal analysis unit configured to:
      resolve communication resource contention between a source DP signal set comprising an AUX+ and AUX− signal pair received from the master signal source and a sink DP signal set comprising an AUX+ and AUX− signal pair received from the optical receiver while a DP communication mode is selected; and
      prioritize a transmission of the source DP signal set to the optical receiver over a transmission of the sink DP signal set to the master signal source.

2. The optical transmitter of claim 1, wherein the auxiliary signal analysis unit includes a protocol analysis state machine configured to:
   perform signal arbitration to resolve the communication resource contention between the source DP signal set and the sink DP signal set; and
   prioritize transmission of the source DP signal set to the optical receiver over transmission of the sink DP signal set to the master signal source.

3. The optical transmitter of claim 1, wherein the auxiliary signal analysis unit includes at least one IO direction control configured to switch a direction of the communication resources between transmitting the source DP signal set to the optical receiver and subsequently transmitting the sink DP signal set to the master signal source.

4. The optical transmitter of claim 1, further comprising a DDC signal analysis unit configured to:
   resolve communication resource contention between a source HDMI signal set comprising a source SCL signal and a source SDA signal received from the master signal source, and a sink HDMI signal set comprising a sink SCL signal and a sink SDA signal received from the optical receiver while an HDMI communication mode is selected; and
   prioritize a transmission of the source HDMI signal set to the optical receiver over transmission of the sink HDMI signal set to the master signal source.

5. The optical transmitter of claim 4, wherein the DDC signal analysis unit includes a protocol analysis state machine configured to:
   perform signal arbitration to resolve the communication resource contention between the source HDMI signal set and the sink HDMI signal set; and
   prioritize transmission of the source HDMI signal set to the optical receiver over transmission of the sink HDMI signal set to the master signal source.

6. The optical transmitter of claim 4, wherein the DDC signal analysis unit includes at least one IO direction control configured to switch a direction of the communication resources between transmitting the source HDMI signal set to the optical receiver and subsequently transmitting the sink HDMI signal set to the master signal source.

7. The optical transmitter of claim 1, further comprising a CEC protocol analysis unit configured to:
   receive a source CEC signal from the master signal source while an HDMI communication mode is selected;
   receive a sink CEC signal from the optical receiver in the HDMI communication mode;
   resolve communication resource contention between the source CEC signal and the sink CEC signal; and
   prioritize a transmission of the source CEC signal to the optical receiver over a transmission of the sink CEC signal to the master signal source.

8. The optical transmitter of claim 7, wherein the CEC protocol analysis unit includes a protocol analysis state machine configured to:

perform CEC arbitration to resolve the communication resource contention between the source CEC signal and the sink CEC signal; and prioritize transmission of the source CEC signal to the optical receiver over transmission of the sink CEC signal to the master signal source.

9. The optical transmitter of claim 1, further comprising an optical communication channel connecting the optical transmitter and the optical receiver, wherein communication between the optical transmitter and the optical receiver is performed via the optical communication channel in either the DP communication mode or the HDMI communication mode.

10. The optical transmitter of claim 9, further comprising an optical interface connecting the optical transmitter to the optical communication channel, wherein the optical interface includes at least one laser diode and at least one photodetector.

11. An optical receiver comprising:
an electrical interface configured to connect with a slave signal sink, wherein one or more electrical signals are communicated between the optical receiver and the slave signal sink via the electrical interface;
a configuration analysis unit configured to:
analyze a first configuration signal received from the slave signal sink and a second configuration signal received from an optical transmitter to determine whether an associated communication protocol is a DP communication protocol or an HDMI communication protocol; and
select a communication protocol from among a DP communication mode and an HDMI communication mode based on the analysis; and
an auxiliary signal analysis unit configured to:
resolve communication resource contention between a source DP signal set comprising an AUX+ and AUX− signal pair received from the optical transmitter and a sink DP signal set comprising an AUX+ and AUX− signal pair received from the slave signal sink while a DP communication mode is selected; and
prioritize a transmission of the source DP signal set to the slave signal sink over a transmission of the sink DP signal set to the optical transmitter.

12. The optical receiver of claim 11, wherein the auxiliary signal analysis unit includes a protocol analysis state machine configured to:
perform signal arbitration to resolve the communication resource contention between the source DP signal set and the sink DP signal set; and
prioritize transmission of the source DP signal set to the slave signal sink over transmission of sink DP signal set to the optical transmitter.

13. The optical receiver of claim 11, wherein the auxiliary signal analysis unit includes at least one TO direction control configured to switch a direction of the communication resources between transmitting the source DP signal set to the slave signal sink and subsequently transmitting the sink DP signal set to the optical transmitter.

14. The optical receiver of claim 11, further comprising a DDC signal analysis unit configured to:
resolve communication resource contention between a source HDMI signal set comprising a source SCL signal and a source SDA signal received from the optical transmitter, and a sink HDMI signal set comprising a sink SCL signal and a sink SDA signal received from the slave signal sink while an HDMI communication mode is selected; and
prioritize a transmission of the source HDMI signal set to the slave signal sink over transmission of the sink HDMI signal set to the optical transmitter.

15. The optical receiver of claim 14, wherein the DDC signal analysis unit includes a protocol analysis state machine configured to:
perform signal arbitration to resolve the communication resource contention between the source HDMI signal set and the sink HDMI signal set; and
prioritize transmission of the source HDMI signal set to the slave signal sink over transmission of the sink HDMI signal set to the optical transmitter.

16. The optical receiver of claim 14, wherein the DDC signal analysis unit includes at least one IO direction control configured to switch a direction of the communication resources between transmitting the source HDMI signal set to the slave signal sink and subsequently transmitting the sink HDMI signal set to the optical transmitter.

17. The optical receiver of claim 11, further comprising a CEC protocol analysis unit configured to:
receive a source CEC signal from the optical transmitter while an HDMI communication mode is selected;
receive a sink CEC signal from the slave signal sink in the HDMI communication mode;
resolve communication resource contention between the source CEC signal and the sink CEC signal; and
prioritize a transmission of the source CEC signal to the slave signal sink over a transmission of the sink CEC signal to the optical transmitter.

18. The optical receiver of claim 17, wherein the CEC protocol analysis unit includes a protocol analysis state machine configured to:
perform CEC arbitration to resolve the communication resource contention between the source CEC signal and the sink CEC signal; and
prioritize transmission of the source CEC signal to the slave signal sink over transmission of the sink CEC signal to the optical transmitter.

19. The optical receiver of claim 11, further comprising an optical communication channel connecting the optical receiver and the optical transmitter, wherein communication between the optical receiver and the optical transmitter is performed via the optical communication channel in either the DP communication mode or the HDMI communication mode.

20. The optical receiver of claim 19, further comprising an optical interface connecting the optical receiver to the optical communication channel, wherein the optical interface includes at least one laser diode and at least one photodetector.

* * * * *

UNITED STATES PATENT AND TRADEMARK OFFICE
CERTIFICATE OF CORRECTION

Page 1 of 2

PATENT NO. : 11,627,290 B2
APPLICATION NO. : 17/876193
DATED : April 11, 2023
INVENTOR(S) : Jianming Yu It is certified that error appears in the above-identified patent and that said Letters Patent is hereby corrected as shown below:

In the Specification

In Column 2, Lines 28, 30, 32, 66, "CONFIG. 1" should be corrected to "CONFIG 1"
In Column 3, Line 12, "AUX--" should be corrected to "AUX-"
In Column 6, Line 14, "one or more one or more" should be corrected to "one or more"
In Column 6, Lines 27, 45, "CONFIG 1." should be corrected to "CONFIG 1"
In Column 8, Line 55, "CONFIG" should be corrected to "CONFIG 1" and "CONFIG. 2" should be corrected to "CONFIG 2"
In Column 8, Line 65, "CONFIG. 1" should be corrected to "CONFIG 1"
In Column 8, Line 66, "CONFIG. 2" should be corrected to "CONFIG 2"
In Column 9, Lines 1, 10, 19, "CONFIG. 1" should be corrected to "CONFIG 1"
In Column 9, Lines 2, 11, 19, "CONFIG. 2" should be corrected to "CONFIG 2"
In Column 9, Line 41, "M_Lane0" should be corrected to "ML_Lane0"
In Column 9, Line 61, "ML_Lane°" should be corrected to "ML_Lane0"
In Column 10, Lines 32, 40, 42, 44, 51, 55, 64, 67, "CONFIG. 1" should be corrected to "CONFIG 1"
In Column 10, Lines 32, 41, 42, 44, 51, 55, 64, 67, "CONFIG. 2" should be corrected to "CONFIG 2"
In Column 11, Lines 33, 35, 57, "CONFIG. 1" should be corrected to "CONFIG 1"
In Column 11, Line 57, "CONFIG. 2" should be corrected to "CONFIG 2"
In Column 12, Lines 2, 16, 18, 20, 25, 26, 34, "CONFIG. 1" should be corrected to "CONFIG 1"
In Column 14, Lines 52, 54, "CONFIG. 2" should be corrected to "CONFIG 2"
In Column 14, Line 53, "CONFIG. 1" should be corrected to "CONFIG 1"
In Column 15, Line 13, "AU-" should be corrected to AUX-" and "CONFIG. 2" should be corrected to "CONFIG 2"
In Column 15, Lines 15, 38, 42, 46, 48, "CONFIG. 2" should be corrected to "CONFIG 2"
In Column 16, Lines 16, 17, 27, 28, "HMDI" should be corrected to "HDMI"
In Column 17, Lines 13, 15, 47, 59, "CONFIG. 2" should be corrected to "CONFIG 2"
In Column 17, Lines 43, 47, 59, "CONFIG. 1" should be corrected to "CONFIG 1"
In Column 18, Lines 5, 17, 18, 20, 22, 28, 36, "CONFIG. 1" should be corrected to "CONFIG 1"
In Column 20, Lines 54, 56, "CONFIG. 2" should be corrected to "CONFIG 2"
In Column 20, Lines 55, "CONFIG. 1" should be corrected to "CONFIG 1"

Signed and Sealed this
Twenty-fourth Day of October, 2023

Katherine Kelly Vidal
*Director of the United States Patent and Trademark Office*

CERTIFICATE OF CORRECTION (continued)
U.S. Pat. No. 11,627,290 B2

In Column 21, Lines 16, 18, 40, 45, 49, 51, "CONFIG. 2" should be corrected to "CONFIG 2"
In Column 22, Lines 7, 17, 19, 29, "HMDI" should be corrected to "HDMI"
In Column 23, Lines 39, 53, "CONFIG. 2" should be corrected to "CONFIG 2"
In Column 23, Lines 34, 53, "CONFIG. 1" should be corrected to "CONFIG 1"
In Column 27, Lines 7, 11, 30, 32, "TO" should be corrected to "IO"
In Column 27, Lines 58, 63, "CONFIG. 1" should be corrected to "CONFIG 1"
In Column 27, Lines 59, 63, "CONFIG. 2" should be corrected to "CONFIG 2"
In Column 28, Lines 12, "CONFIG. 2" should be corrected to "CONFIG 2"

In the Claims

In Column 35, Line 56, in Claim 13, "TO" should be corrected to "IO"